United States Patent
Valls Hernández et al.

(10) Patent No.: US 10,467,914 B2
(45) Date of Patent: *Nov. 5, 2019

(54) METHODS AND SYSTEMS FOR AUTONOMOUS GENERATION OF SHORTEST LATERAL PATHS FOR UNMANNED AERIAL SYSTEMS

(71) Applicant: The Boeing Company, Chicago, IL (US)

(72) Inventors: Ernesto Valls Hernández, Madrid (ES); Francisco A. Navarro Félix, Madrid (ES); David Sánchez Tamargo, Madrid (ES); Carlos Querejeta Masaveu, Madrid (ES); Jesús Cuadrado Sánchez, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,545

(22) Filed: Apr. 3, 2018

(65) Prior Publication Data

US 2018/0233050 A1    Aug. 16, 2018

Related U.S. Application Data

(63) Continuation of application No. 15/206,189, filed on Jul. 8, 2016, now Pat. No. 10,032,383.

(30) Foreign Application Priority Data

Jul. 14, 2015  (EP) ..................... 15382365

(51) Int. Cl.
*G08G 5/00* (2006.01)
*G01C 21/20* (2006.01)
*B64C 39/02* (2006.01)

(52) U.S. Cl.
CPC ............ *G08G 5/006* (2013.01); *B64C 39/024* (2013.01); *G01C 21/20* (2013.01); *G08G 5/0052* (2013.01);
(Continued)

(58) Field of Classification Search
CPC ...... G08G 5/00; G08G 5/0021; G08G 5/0013; G08G 5/025; G08G 5/0082; G08G 5/0069;
(Continued)

(56) References Cited

U.S. PATENT DOCUMENTS 4,956,780 A * 9/1990 Sankrithi ............. G05D 1/0676
                                                        244/181
6,226,610 B1    5/2001 Keiller et al.
(Continued)

FOREIGN PATENT DOCUMENTS

EP    2863177    4/2015

OTHER PUBLICATIONS

European Patent Office, "Extended European Search Report," issued in connection with European Patent Application No. 15382365.3, dated Jan. 5, 2016, 7 pages.
(Continued)

*Primary Examiner* — Courtney D Heinle
*Assistant Examiner* — Luis A Martinez Borrero
(74) *Attorney, Agent, or Firm* — Hanley, Flight & Zimmerman, LLC

(57) ABSTRACT

Methods and systems for autonomous generation of shortest lateral paths for unmanned aerial systems are described. An example system includes memory storing code and at least one processor to execute the code to cause the at least one processor to access an initial scenario including a source point, a target point, and a no flight zone, determine a computation time for identifying a lateral path for an aircraft
(Continued)

to traverse that avoids the no flight zone, determine whether the determined computation time satisfies a threshold of a reference computation time, change the first number of vertices to a second number of vertices when the reference computation time is not satisfied, determine a buffer area surrounding the no flight zone, construct a visibility graph including lateral paths, and identify one of the lateral paths as being shorter than others of the lateral paths.

23 Claims, 10 Drawing Sheets

(52) U.S. Cl.
CPC ...... *G08G 5/0069* (2013.01); *B64C 2201/141* (2013.01)

(58) Field of Classification Search
CPC ........ G08G 5/006; G08G 1/123; G08G 1/205; B64C 2201/063; B64C 2201/066; B64C 2201/145; B64C 39/024; B64C 39/02; G01C 21/20
See application file for complete search history.

(56) References Cited

U.S. PATENT DOCUMENTS

| | | | | |
|---|---|---|---|---|
| 6,266,610 | B1* | 7/2001 | Schultz | G05D 1/101 701/528 |
| 6,745,115 | B1* | 6/2004 | Chen | B64D 45/04 244/75.1 |
| 7,228,232 | B2 | 6/2007 | Bodin et al. | |
| 7,512,462 | B2 | 3/2009 | Nichols et al. | |
| 8,768,555 | B2 | 7/2014 | Duggan et al. | |
| 9,053,634 | B2 | 6/2015 | Vilaplana et al. | |
| 9,087,452 | B2 | 7/2015 | del Pozo de Poza et al. | |
| 9,224,302 | B1* | 12/2015 | Young | G08G 5/0039 |
| 9,262,933 | B2 | 2/2016 | Hoy | |
| 9,483,950 | B2 | 11/2016 | Wang et al. | |
| 9,524,647 | B2* | 12/2016 | Kohn-Rich | G05D 1/0646 |
| 9,616,993 | B1 | 4/2017 | Shapiro et al. | |
| 9,691,287 | B1* | 6/2017 | Shapiro | G06F 3/013 |
| 9,718,557 | B2* | 8/2017 | Zubairi | B64D 45/00 |
| 9,824,594 | B2* | 11/2017 | Lissajoux | G08G 5/0047 |
| 10,032,383 | B2* | 7/2018 | Valls Hernandez | B64C 39/024 |
| 10,037,704 | B1* | 7/2018 | Myr | G08G 5/0043 |
| 10,102,756 | B2* | 10/2018 | Burke | G08G 5/0008 |
| 2001/0023390 | A1* | 9/2001 | Gia | G01C 21/00 701/301 |
| 2002/0183922 | A1 | 12/2002 | Tomasi et al. | |
| 2003/0030582 | A1* | 2/2003 | Vickers | G01S 17/023 342/54 |
| 2004/0049341 | A1* | 3/2004 | Fujiwara | G01C 21/3638 701/436 |
| 2005/0248470 | A1* | 11/2005 | Berthe | G01C 5/005 340/961 |
| 2006/0184294 | A1* | 8/2006 | Ma | G01C 21/00 701/25 |
| 2006/0235610 | A1 | 10/2006 | Ariyur et al. | |
| 2008/0103691 | A1* | 5/2008 | Chen | G01C 5/005 701/448 |
| 2010/0094485 | A1* | 4/2010 | Verlut | G01C 21/005 701/3 |
| 2014/0032034 | A1 | 1/2014 | Raptopoulos et al. | |
| 2014/0278069 | A1* | 9/2014 | Passinger | G01C 23/00 701/465 |
| 2016/0180715 | A1* | 6/2016 | Burke | G08G 5/0008 701/467 |
| 2016/0210863 | A1* | 7/2016 | Kohn-Rich | G05D 1/0646 |
| 2016/0218086 | A1 | 7/2016 | Kohn-Rich | |
| 2017/0018184 | A1* | 1/2017 | Northrup | G08G 1/144 |
| 2017/0092135 | A1* | 3/2017 | Hardt | G08G 5/0017 |
| 2017/0113799 | A1 | 4/2017 | Kovac et al. | |
| 2017/0116863 | A1* | 4/2017 | Valls Hern ndez | B64C 39/024 |
| 2017/0131717 | A1 | 5/2017 | Kugelmass | |
| 2017/0132942 | A1 | 5/2017 | Mere | |
| 2017/0132943 | A1 | 5/2017 | Moon et al. | |
| 2017/0148330 | A1 | 5/2017 | Gillet | |
| 2017/0154535 | A1 | 6/2017 | Downey et al. | |
| 2017/0193830 | A1 | 7/2017 | Fragoso et al. | |
| 2018/0033244 | A1* | 2/2018 | Northrup | H04W 4/21 |
| 2018/0090015 | A1* | 3/2018 | Mere | G08G 5/0034 |

OTHER PUBLICATIONS

Yang et al., "An Efficient Path Planning and Control Algorithm for RUAV's in Unknown and Cluttered Environments," J Intell Robot Systems (2010) 57:101-122, 22 pages.

Sarkar, et al. "Finding rectilinear least cost paths in the presence of convex polygonal congested regions," Computers & operations research 36 (2009) 737-754, 24 pages.

Liu et al., "Finding shortest path on Land Surface," The Hong Kong University of Science and Technology, Jun. 2011, 12 pages.

Kamrani et al., "Simulation-Aided Path Planning of UAV," Proceedings of the 2007 Winter Simulation Conference, IEEE, 9 pages.

Blum et al, "Navigation in Unfamiliar Geometric Terrain," 1997, 28 pages.

Kim et al., "Discrete Approximations to Continuous Shortest-Path: Application to Minumum-Risk Path Planning for Groups of UAVs," Proceedings of the 42nd IEEE Conference on Decision and Control Maui, Hawaii USA, Dec. 2003, 7 pages.

Snyder, "Space Oblique Mercator Projection Mathematical Development," Geological Survey Bulletin 1518, U.S. Department of the Interior, 1981, 120 pages.

Skiena, "DouglasPeucker line simplification algorithm implementation by Jack Snoeyink," Jul. 7, 2008, accessed on Jul. 7, 2016, [http://www3.cs.stonybrook.edu/~algorith/implement/DPsimp/implement.shtml], 2 pages.

"Visibility Graph," accessed on Jul. 7, 2016, [http://cs.smith.edu/~orourke/books/ArtGalleryTheorems/Art_Gallery_Chapter_7.pdf], 37 pages.

Goodman et al., "Dijkstra's Algorithm" From MathWorld—A Wolfram Web Resource. Accessed on Jul. 7, 2016, [http://mathworld.wolfram.com/DijkstrasAlgorithm.html], 1 page.

"Boost Software License," accessed on Jul. 7, 2016, [http://www.boost.org/users/license.html], 5 pages.

"The CGAL License," accessed on Jul. 7, 2016, [https://www.cgal.org/license.html], 2 pages.

"License POCO C++ Libraries," accessed on Jul. 7, 2016, [http://pocoproject.org/license.html], 1 page.

Qu et al., "Flight Path Planning of UAV Based on Heuristically Search and Genetic Algorithms," 2005 IEEE, Northwestern Polytechnical Universtiy, 5 pages.

Yadav et al., "Neural Network Approach for Obstacle Avoidance in 3-D Environments for UAVs," Proceeding of the 2006 American Control Conference Minneapolis, Minnesota, USA, Jun. 14-16, 2006, 6 pages.

Vincent et al., "A Framework and Analysis for Cooperative Search Using UAV Swarms," 2004 ACM Symposium on Applied Computing, 8 pages.

Oral et al., "A Multi-Objective Incremental Path Planning Algorithm for Mobile Agents," 2012 IEEE/WIC/ACM International Conferences on Web Intelligence and Intelligent Agent Technology, 8 pages.

United States Patent and Trademark Office, "Non-Final Office Action," issued in connection with U.S. Appl. No. 15/206,189, dated Jul. 21, 2017, 40 pages.

United States Patent and Trademark Office, "Notice of Allowance," issued in connection with U.S. Appl. No. 15/206,189, dated Dec. 15, 2017, 38 pages.

European Patent Office, "Extended European Search Report", dated Nov. 28, 2018, in connection with European Patent Application No. 18188156.6 (8 pages).

* cited by examiner

METHODS AND SYSTEMS FOR AUTONOMOUS GENERATION OF SHORTEST LATERAL PATHS FOR UNMANNED AERIAL SYSTEMS

RELATED APPLICATION

This patent claims the benefit of U.S. application Ser. No. 15/206,189, filed on Jul. 8, 2016, which claims the benefit of European Patent Application No. EP15382365.3 filed on Jul. 14, 2015. U.S. application Ser. No. 15/206,189 and European Patent Application No. EP15382365.3 are hereby incorporated herein by reference in their entireties.

BACKGROUND

Unmanned aircraft may be used to fly between a source point and a target point. No flight zones may be present in some areas.

SUMMARY

An example system includes memory storing computer readable code and at least one processor to execute the computer readable code to cause the at least one processor to access an initial scenario including a source point, a target point, and a no flight zone, determine a computation time for identifying a lateral path for an aircraft to traverse that avoids the no flight zone, the computation time being associated with a first number of vertices of the no flight zone, determine whether the determined computation time satisfies a threshold of a reference computation time, when the computation time does not satisfy the threshold of the reference computation time, change the first number of vertices of the no flight zone to a second number of vertices of the no flight zone to enable a subsequently determined computation time to satisfy the threshold, determine a buffer area surrounding the no flight zone, wherein the buffer area is defined by an offset distance from a perimeter of the no flight zone, construct a visibility graph including lateral paths between the source point and the target point, the lateral paths not passing through the no flight zone, the lateral paths connecting the first number of vertices or the second number of vertices of the no flight zone, the first number of vertices or the second number of vertices taking into account the buffer area, and identify a first lateral path of the lateral paths, the first lateral path being shorter than others of the lateral paths.

Another example system includes memory storing computer readable code and at least one processor to execute the computer readable code to cause the at least one processor to define an area between a source point and a target point, identify a first no flight zone within the area, identify a second no flight zone outside of the area, estimate a first computation time to determine a first lateral path for an aircraft to traverse between the source point and the target point, the estimating to consider the first no flight zone, the estimating not to consider the second no flight zone, compare the first computation time to a reference computation time, modify the first no flight zone to be a third no flight zone when the first computation time does not satisfy a threshold of the reference computation time, and estimate a second computation time to determine a second lateral path for the aircraft to traverse between the source point and the target point, the estimating to consider the third no flight zone.

Yet another example system includes memory storing computer readable code and at least one processor to execute the computer readable code to cause the at least one processor to determine an initial path estimate between a source point and a target point associated with a flight of an aircraft, identify a first no flight zone and a second no flight zone, determine a first buffer area surrounding the first no flight zone and a second buffer area surrounding the second no flight zone, wherein the first buffer area is defined by an offset distance from a perimeter of the first no flight zone and the second buffer area is defined by an offset distance from a perimeter of the second no flight zone, identify an overlap between the first no flight zone including the first buffer area and the second no flight zone including the second buffer area, merge the first no flight zone including the first buffer area and the second no flight zone including the second buffer area into a third no flight zone including a third buffer area when the overlap is identified, construct a visibility graph including lateral paths between the source point and the target point, the lateral paths not passing through the third no flight zone including the third buffer area, the lateral paths connecting vertices of the third no flight zone, and identify a first lateral path of the lateral paths, the first lateral path being shorter than others of the lateral paths.

BRIEF DESCRIPTION OF THE FIGURES

FIG. 7a shows an example geodetic scenario and FIG. 7b shows the example scenario projected in cartographic coordinates.

FIG. 8a shows an example Bounding Box strategy application and FIG. 8b shows an example linear simplification strategy application.

DETAILED DESCRIPTION

A description of several examples of the present disclosure is carried out, with illustrative character and without limitation, making reference to the numbering used in the figures.

Figure 1:
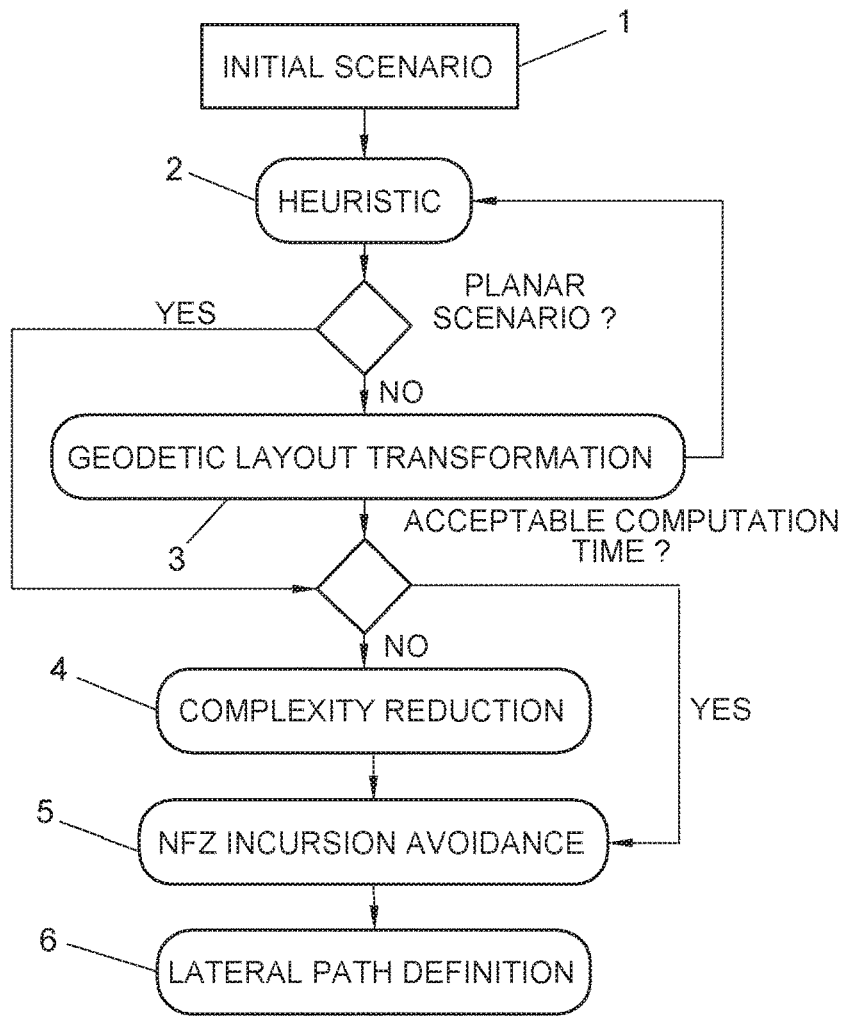
FIG. 1. Shows an example flow diagram of a particular example of a method for autonomous generation of shortest lateral paths for Unmanned Aerial Systems (UAS) avoiding no-flight zones (NFZs). The flow diagram represents some example processes of the example method.

In a particular example of the disclosure, the method includes example processes that are shown in the flow diagram of FIG. 1. FIGS. 2 to 6 show corresponding example processes of each main process of FIG. 1.

Figure 2:
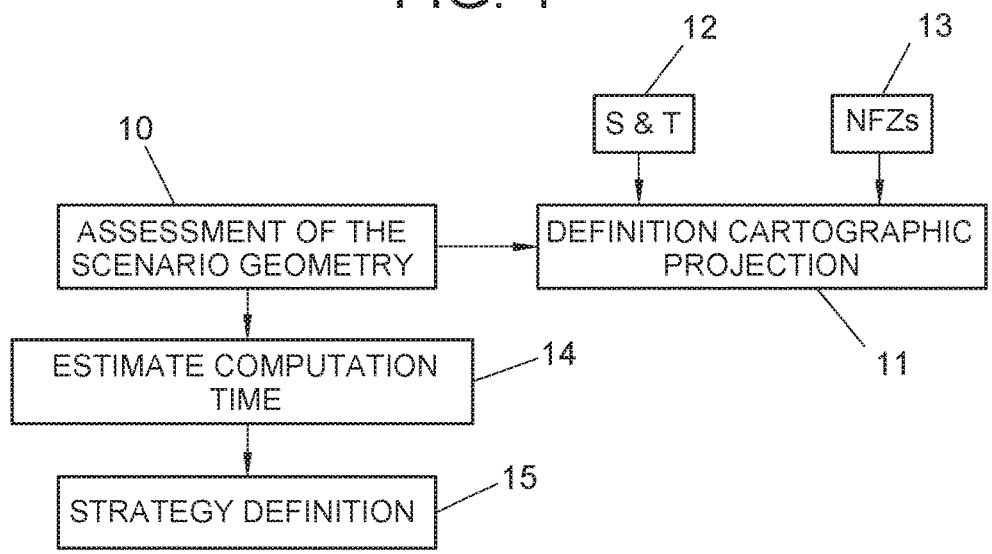
FIG. 2. Shows an example flow diagram of a particular example of the sub-processes relating to an example Heuristic process of FIG. 1.

With reference to the example flow diagram of FIG. 1, after an initial and/or first scenario (1) is provided, the example method performs the example "Heuristic process" (2). The example Heuristic process (2) assesses the initial scenario (1) to define a strategy (e.g., a strategy that enables some goals to be achieved such as, for example, reducing computation time and identifying a short lateral path) to find and/or identify a feasible solution that takes into account computation time and accuracy of the final lateral path. As shown in the example of FIG. 2, the Heuristic process (2) includes three sub-processes:

As shown in FIG. 2, the first sub-process includes the Assessment of the Scenario Geometry (10). This sub-process includes obtaining and/or accessing some geometric information such as, for example, the Source (departure) and Target (destination) points (S&T) (12) and the existing no flight zones (13) from the initial scenario (1) to identify the cartographic projection (11) to reduce distortions at the overall scenario. Initially, in some examples, a majority of the scenarios are defined in geodetic coordinates on the earth's surface and contain information and/or data identifying and/or associated with the no flight zones. In some examples, the data identifying and/or associated with the no flight zones are related to the Shortest Path Configuration Space (SPCS) and/or the no flight zones are related to the Shortest Path Configuration Space (SPCS). As used herein, the Shortest Path Configuration Space is defined as the area of interest of the overall initial scenario including the no flight zones disposed therein. In some examples, no flight zones outside of the Shortest Path Configuration Space, assuming that they exist, are clipped and/or removed from consideration to enable the examples disclosed herein to obtain a relatively more accurate estimation of the cartographic parameters and/or to enable the cartographic parameters to be more rapidly determined and/or defined. In such examples, the clipping and/or removal is executed after the scenario is translated into a cartographic plane. In some examples, the no flight zones outside of the Shortest Path Configuration Space are removed from consideration using, for example, the cartographic projection in the ensuing first sub-process (e.g., FIG. 2) of the second main process (FIG. 1). Thus, in the illustrated example, the Heuristic process (2) makes a preliminary estimation of the scenario location and a geometric extension based on the no flight zones (e.g., all of the no flight zones within a particular area of consideration) and, optionally, the example Heuristic process makes a second estimation once the no flight zones that are outside of the Shortest Path Configuration Space have been clipped and/or removed from consideration. Based on the geometric information obtained, in the illustrated example, the example Heuristic process (2) defines a cartographic projection (11) that, in some examples, will be used in the Geodetic Layout Transformation (3) process of FIG. 1 to translate the original and clipped geodetic scenario into a cartographic scenario. In the illustrated example of FIG. 2, at the end of the Assessment sub-process (10), the parameters that are used to define a cartographic projection (11) for each scenario are identified. For example, scenarios with no flight zones located in up to 10° to both sides of the source/target segment defined between the source and target points (a segment joining points S&T) may be projected through an example Oblique Mercator Projection. However, in some examples, this projection may not be directly applied on global scenarios (no flight zones located further than 10° from the S&T segment) because distortion may be larger than expected.

In the illustrated example of FIG. 2, the second sub-process is the example Estimation of the Computation Time (14). Based on previous analysis of different scenarios, in some examples, some internal functions are built to estimate the overall computation time of the method execution for each particular scenario. In some examples, the computation time is affected by: i) the number of no flight zones that will be potentially involved in the Shortest Path Configuration Space; ii) the efficiency of the implemented algorithms and; iii) the computational resources. Although the number of no flight zones, the efficiency of the implemented algorithms and the computational resources are not constants, the number of no flight zones, the efficiency of the implemented algorithms and the computational resources may be relatively precisely estimated to define the internal function that will be used to estimate the expected computation time.

In the illustrated example of FIG. 2, the third sub-process is the Strategy Definition (15). This example sub-process (15) considers the estimated computation time previously obtained and the computation time requirements (if the computation time requirements were previously defined) and finds and/or determines a feasible solution to meet such time. In other words, the strategy definition (15) determines a solution that enables a threshold to be met. In examples in which the estimated time is longer than required and/or if the estimated computational time does not satisfy a threshold of the desired computational time so the estimated computation time is not acceptable and/or does not satisfy the threshold, an example Complexity Reduction process (4) of FIG. 1 over the no flight zones is performed as detailed in the illustrated example of FIG. 4. If the example Complexity Reduction process (4) is performed based on, for example, the estimated computational time not satisfying the threshold of the desired computational time, the example Heuristic process (1) selects a complexity reduction strategy to meet the required computation time. For example, the Heuristic process may select one of a plurality of complexity reduction strategies based on the ability of the one of the plurality of complexity reduction strategies enabling the estimated computational time to satisfy the threshold of the desired computational time. In examples in which some of the no flight zones are removed from consideration to decrease the estimated computational time, the example complexity reduction of the scenario may reduce the accuracy of the final path because some of the vertices that define the original no flight zones will be removed and/or clipped from the scenario and/or from consideration. Hence, in some examples, the example Heuristic process (2) balances the computation time against the loss of accuracy in the final lateral path. Depending on the scenario and the context in which the example method is applied, in some examples, a faster solution (e.g., a faster computational time) may be preferred over a more accurate solution that takes longer (e.g., a slower computational time). As discussed in more detail below in FIG. 4, an example Bounding Box strategy and/or an example Linear simplification strategy may be selected by the Heuristic depending on the circumstances and/or the constraints (e.g., computational time versus accuracy) of the problem.

As illustrated in the example of FIG. 1, the second main process of the example method is the example Geodetic Layout Transformation (3). In some examples, scenarios are defined in geodetic coordinates on the earth's surface, although they may alternatively be provided in Cartesian coordinates. In examples in which the example scenario is provided in Cartesian coordinates as opposed to geodetic coordinates, the example process of Geodetic Layout Transformation (3) may not be executed. Thus, in some examples, Geodetic Layout Transformation (3) is performed when the example initial scenario provided includes geodetic coordinates and not Cartesian coordinates. In some examples, determining and/or solving the shortest lateral path problem on geodetic coordinates uses relatively large amounts of computational resources. Thus, in some examples, the shortest lateral path is determined in a planar domain. As illustrated in the example of FIG. 1, the example Geodetic Layout Transformation process (3) translates the initial geodetic scenario (1) into a Cartesian scenario and estimates the Projection Distortion Factor (PDF). The illustrated example of FIG. 3 shows the sub-processes of the example Geodetic Layout Transformation process (3) of FIG. 1.

Figure 3:
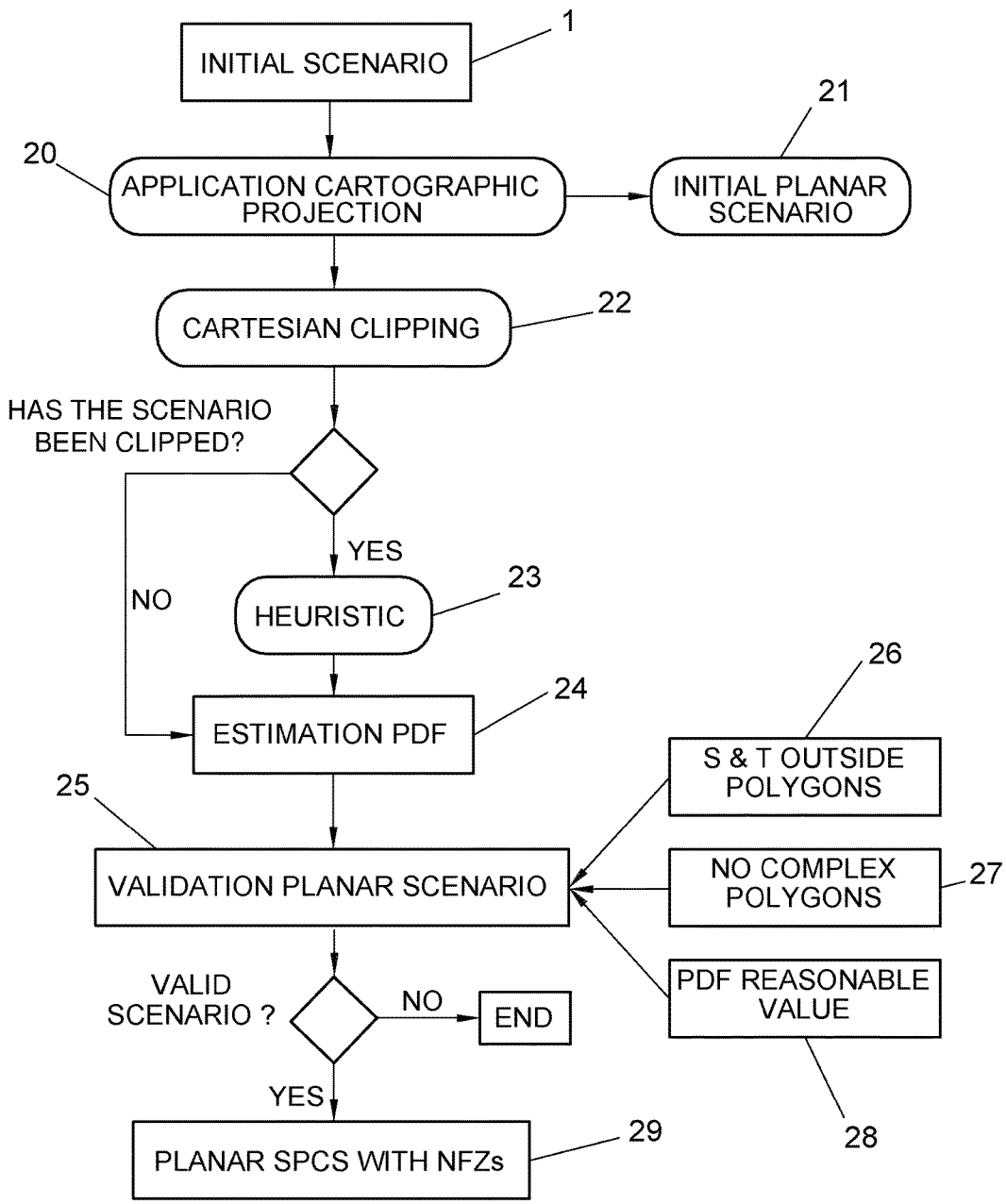
FIG. 3. Shows an example flow diagram of example sub-processes of an example Geodetic Layout Transformation process of FIG. 1.
Figure 7A:
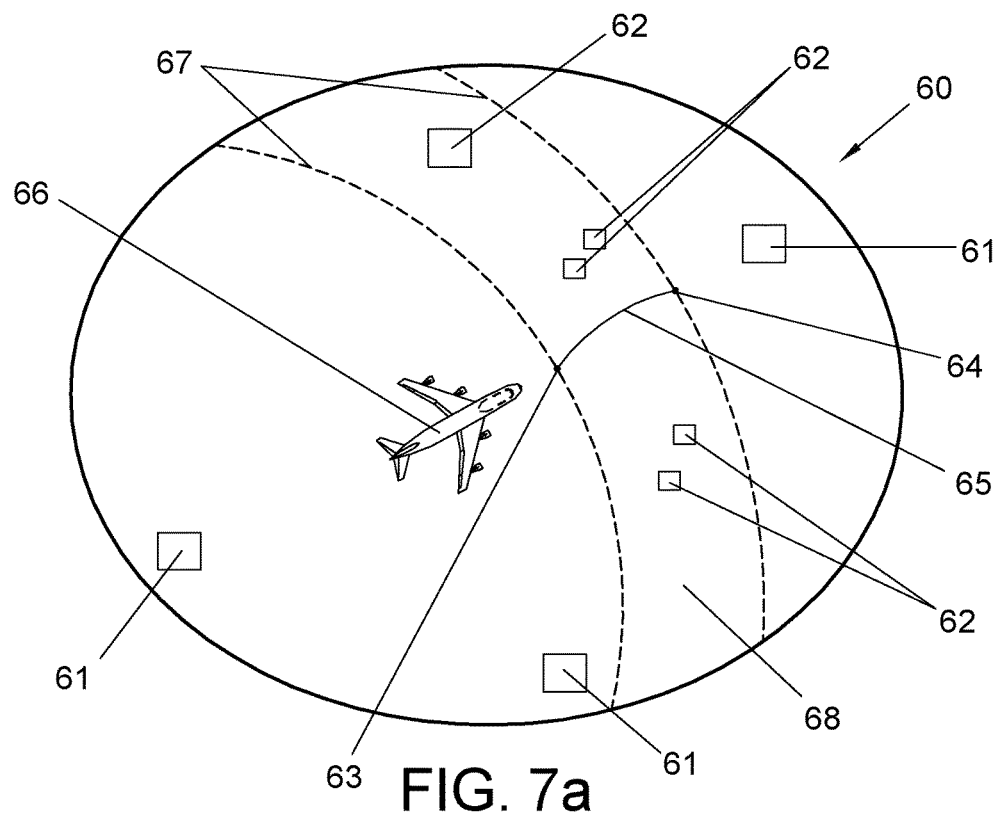
FIGS. 7a and b. Show a particular example of a scenario in which the Shortest Path Configuration Space (SPCS) has been defined.
Figure 7B:
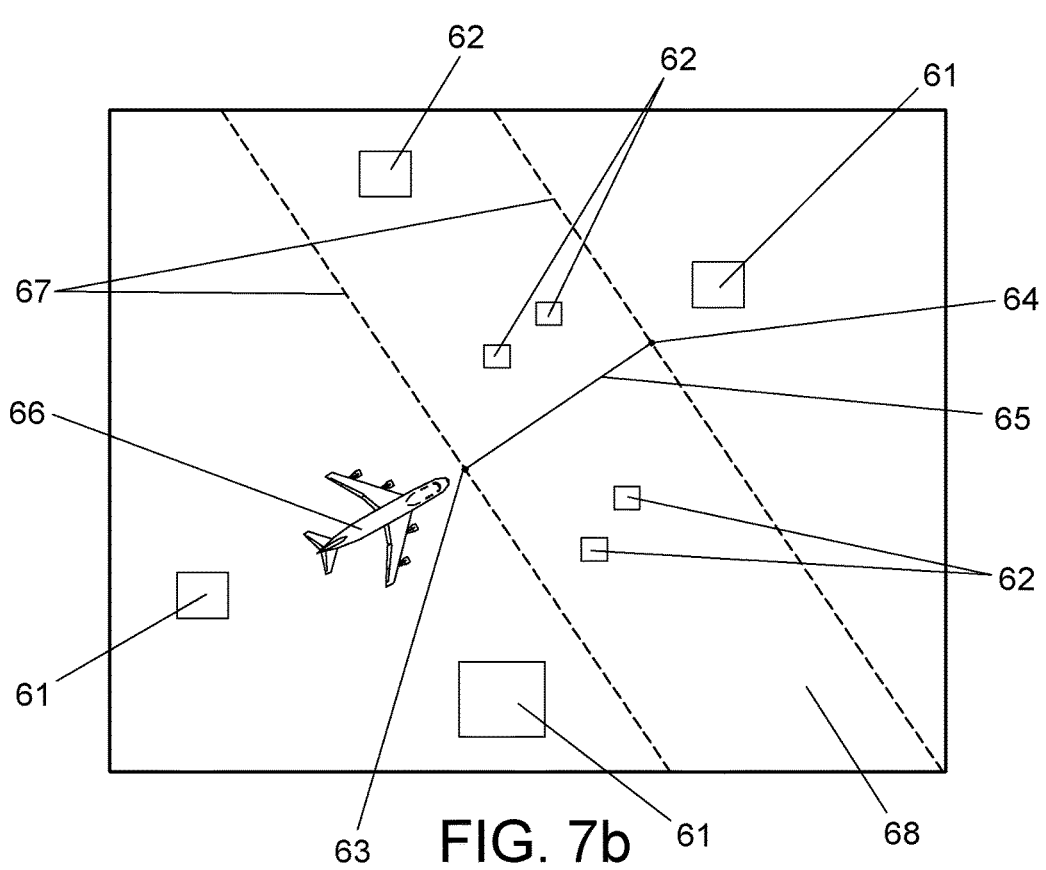

As illustrated in the example of FIG. 3, the first sub-process is the Application of the Cartographic Projection (20). The example Application of the Cartographic Projection (20) applies the cartographic projection defined in the Heuristic process (2) of FIG. 1 to the overall initial scenario (1) to translate the geodetic coordinates into Cartesian coordinates of the corresponding projection. Based on the processes of the Application Cartographic Projection (20), an initial planar scenario (21) is determined and/or generated. Referring to the example of FIG. 7a, a particular example of a geodetic scenario (60) includes a plurality of no flight zones (61,62) and an unmanned aerial system (66) flying from a source point (63) to a target point (64). The example S&T segment (65) joins, in geodetic coordinates, both the source and target points (63,64). The illustrated example of FIG. 7b shows the cartographic translation of the geodetic scenario of FIG. 7a into Cartesian coordinates.

Referring back to the illustrated example of FIG. 3, the second sub-process is a Cartesian Clipping (22) applied on the initial planar scenario (21). The example process is performed by clipping and/or not considering some portions of the initial scenario and/or portions outside of the shortest lateral path where the shortest path configuration space is defined as an area having no flight zone polygons involved in the shortest lateral path definition. In some examples, to identify such polygons, the example method assumes that: i) it is possible to consider geodetic lines on the cartographic plane as straight segments (instead of being curves), because the Projection Distortion Factor (PDF) is kept under a threshold tolerance value; and ii) the cartographic projection used is conformal (angles on the earth's surface are preserved on the plane). In some examples, these assumptions enable the complexity of the clipping problem to be reduced. As illustrated in the example of FIG. 7b, the S&T segment (65) is considered as a straight segment and/or a substantially straight segment enabling lines (67) that pass through S&T points (63,64) to be relatively easily defined. As illustrated example of 7b, the lines (67) are substantially perpendicular relative to the S&T segment (65). As shown in the example of FIG. 7b, the lines (67) define the approximated earth's slice and/or an area that encloses the Shortest Path Configuration Space (SPCS) (68). Given that the examples disclosed herein may be implemented in connection with unmanned aerial systems that tend to fly from a Source point to a Target points, no flight zones (NFZs) (61) behind those lines (67) may be disregarded. In other words, given that the examples disclosed herein are implemented with unmanned aerial systems that may not deviate between the source point and the target point, no flight zones outside of the source and target points, not between the source and target points and/or outside of a space defined between the source and target points may be disregarded when determining the shortest flight path and/or a flight path that satisfies one or more thresholds (e.g., a threshold regarding computational time(s), a threshold regarding flight time, etc.). As a result, in some examples, remote no flight zones (NFZs) (61) or no flight zones (61) outside of the area associated with the shortest path configuration space (68) may not be considered and/or may be discarded from the original scenario. In such examples, the initial number of no flight zones (NFZs) polygons is reduced and the extension of the scenario is changed. Hence, in this example, the initial estimations made by the Heuristic process (2) is updated based on the shortest path configuration space (68) and/or the no flight zones (61) outside of and/or spaced from the shortest path configuration space (68).

In examples in which the scenario results are clipped and the number of no flight zones (NFZs) are reduced (by deleting and/or not considering no flight zone (NFZs) located outside the Shortest Path Configuration Space (SPCS)), a second invocation of the example Heuristic process (23) is performed to update the cartographic parameters and the estimated computation time of the scenario based on the new and/or updated projected and clipped scenario (e.g., an updated scenario, a second scenario, etc.). In other words, the Heuristic process (23) process the data after outlier no-fly zones are removed from consideration. In examples in which no flight zones (NFZs) are not located outside of the Shortest Path Configuration Space (SPCS, the number of no flight zones (NFZs) remains the same before and after the cartesian clipping (22). In other words, if there are zero no flight zones outside of the shortest path configuration space (68), there are zero no flight zones to remove from the problem being solved and, thus, the example method directly passes to the example Estimation of the Projection Distortion Factor (PDF) sub-process (24) of FIG. 3.

As illustrated in the example of FIG. 3, the Estimation of the Projection Distortion Factor (PDF) sub-process (24) obtains and/or accesses data and/or information associated with and/or regarding the maximum distortion produced on the no flight zones (NFZs) by the cartographic projection. Depending on the location of the no flight zone polygons in the cartographic projection plane, in some examples, the distortion factor is equal, greater or less than one. In some examples, distortion factors greater than one may be considered relevant for the example method given that distance measures on the cartographic plane is a shortest geodetic distance on the earth's surface. For example, 1 meter measure on the cartographic plane considering a Projection Distortion Factor (PDF) of 1.0001 corresponds to 0.9999 meters on the earth's surface. Therefore, in some examples, the Projection Distortion Factor (PDF) is used to define the safe distance in the no flight zone incursion avoidance process (5) to substantially ensure a threshold distance is maintained between the aircraft and the no flight zone. In other words, the projection distortion factor affects the actual distance between an aircraft (e.g., an unmanned aerial system) and a no flight zone. Thus, in accordance with the teachings of this disclosure, the determined projection distortion factor enables a threshold distance to be maintained between the aircraft and no flight zones throughout a mission between the source and target points.

Once the Shortest Path Configuration Space (SPCS) has been defined and/or determined (optionally it could be even more precisely defined in the second iteration of the Heuristic process (23)) and the Projection Distortion Factor (PDF) has been estimated (24)), the next sub-process of the example of FIG. 3 is the example Validation of the Cartesian Scenario (25) (e.g., the validation of the planar scenario). In some examples, to enable a scenario (e.g., an initial scenario, an updated scenario, a clipped scenario, etc.) to be processed to identify the shortest path between the source and target points, the respective scenarios are processed to determine if one or more thresholds are satisfied. As shown in the example of FIG. 3, the validation of the Cartesian scenario and/or planar scenario (25) determines and/or identifies if the Source and Target points are inside of one of the no flight zone polygons (26). In examples in which the source and target points are defined within a no flight zone polygon (26), the example method may be unable to identify a route (e.g., a lateral path) that does not pass through a no flight zone(s). Thus, in such examples, if any of the S&T points (e.g., source and target points) are inside of any polygon (e.g., the no flight zone polygons), then there are no lateral paths available that do not violate the no flight zones (NFZs) and the example method may not be applicable and/or the example method may suggest an alternative source and/or target points (e.g., an alternative route) that do not violate the no flight zones. Secondly, as illustrated in the example of FIG. 3, the example method checks and/or processes the geometry of the projected no flight zone (NFZs) polygons (27). In some examples, depending on the shape of the polygons defined by the no flight zones, examples disclosed herein may simplify the shape of the polygon to increase the speed at which processing can occur. For example, the examples disclosed herein may simplify and/or reduce the complexity of a polygon by removing holes disposed within a boundary of the no-fly zone polygon, combining polygons that intersect one another and/or reducing the complexity of the shape of a polygon by removing vertices should, for example, the polygon intersect itself. If the method determines that the complexity of the polygons is relatively high, the example method may apply an example simplification algorithm to the no flight zone contours. In such examples, the example simplification algorithm may reduce the complexity of the no flight zone polygon, thereby reducing the complexity of the problem being solved. Thirdly, the example method checks and/or determines whether the Projection Distortion Factor (PDF) has a reasonable value (28) and/or whether or not the projection distortion factor satisfies a threshold. In some examples, determining that the projection distortion factor satisfies the threshold includes determining that the distortion for the specific scenario is feasible. In some examples, a reference Projection Distortion Factor (PDF) threshold is established and/or defined and compared to the reference Projection Distortion Factor (PDF) to determine whether the determined projection distortion factor satisfies a threshold of the reference projection distortion factor. In some examples, at the end of the validation sub-process (26), the outcome will be the portion of the planar scenario corresponding to the Shortest Path Configuration Space (SPCS) including a set of no flight zone planar polygons inside the Shortest Path Configuration Space (SPCS).

Figure 4:
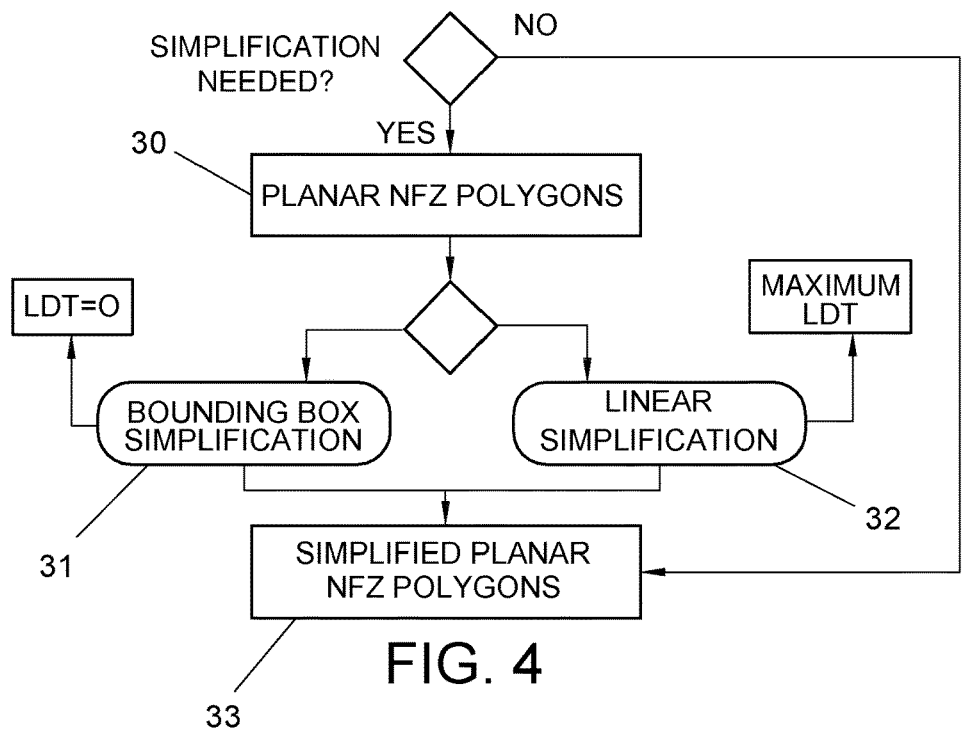
FIG. 4. Shows an example flow diagram of example sub-processes of an example Complexity Reduction process of FIG. 1.
Figure 8A:
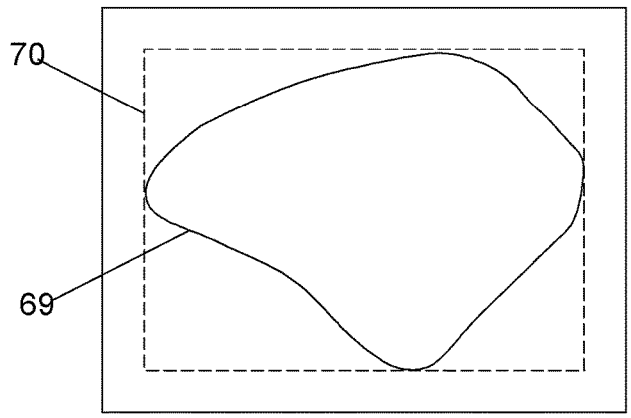
FIGS. 8a and b. Show a particular example of a scenario to which an example simplification strategy is applied. Specifically.

As illustrated in the example of FIG. 1, the third main process includes a Complexity Reduction (4). In the illustrated example, the overall number of vertices that defines the no flight zones (NFZs) is used to obtain a solution that meets and/or satisfies a threshold response time (e.g., a required response time). In some examples, the complexity reduction process (4) applies different vertex reduction strategies to simplify the geometry of the no flight zone polygons to reduce the overall computation time in processes and, more generally, to decrease the computation time of the examples disclosed herein. Some example processes associated with the complexity reduction (4) are performed when the estimated computation time to obtain the shortest lateral path does not satisfy a threshold and/or the estimated computation time is higher than a threshold value (e.g., a required time). In examples in which the estimated computation time satisfies a threshold, then the planar no flight zone polygons may be directly considered as the simplified planar no flight zone polygons. In some examples, reducing the number of vertices defined by a no flight zone may reduce the accuracy of the obtained lateral path given that the examples disclosed herein use the no flight zone vertices to determine and/or identify the lateral path. However, in some examples, having a greater number of vertices define the no flight zone may increase the computation time to identify a lateral path having higher precision and/or accuracy. Thus, constraints of processing time and accuracy of the lateral path identified are considered and/or weighted when approaching a particular problem. Given the balancing between processing time and the accuracy of the lateral path identified, in the illustrated example, the example heuristic process (2,23) balances between meeting the threshold computation time (e.g., the required computation time) and the number of vertices and recommends a suitable reduction strategy that provides, for example, the highest level of accuracy while satisfying the threshold computation time. As shown in the illustrated example of FIG. 4, the method applies the example reduction strategy over the planar no flight zone polygons (30) inside the Shortest Path Configuration Space (SPCS) to obtain a set of Simplified Planar no flight zone polygons (33). In some examples, two possible reduction strategies are considered:

As illustrated in the example of FIG. 4, the example Bounding Box simplification strategy (31) bounds all the polygons by rectangular areas reducing the number of vertices to four times the number of no flight zones (NFZs). In other words, the Bounding Box simplification strategy (31) defines four vertices per no flight zone. Examples implementing the example Bounding Box simplification strategy (31) may reduce the amount of computation time at the expense of accuracy in the lateral path identified and/or the lateral path solution. The example of FIG. 8a shows the application of the example Bounding Box simplification strategy to a particular no flight zone (69). As shown in the example of FIG. 8a, the Bounding Box simplification strategy defines a four sided box (70) with dimensions corresponding to the longer distances of the initial planar no flight zones (NFZ).

Figure 8B:
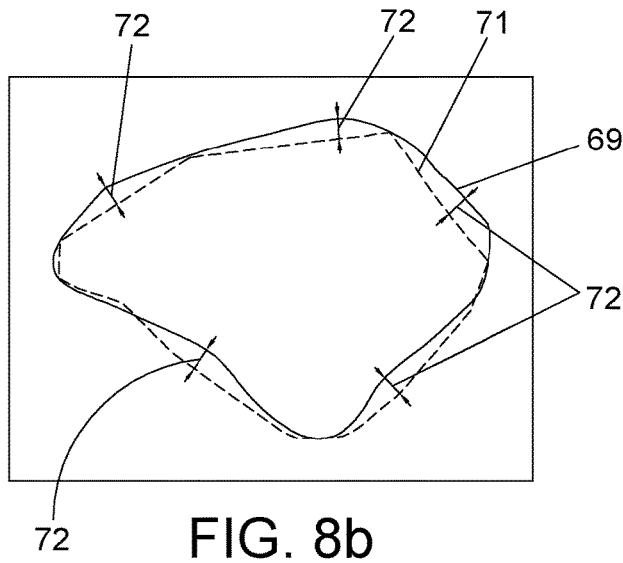

As illustrated in the example of FIG. 4, the Linear Simplification strategy (32) is based on an example customized Douglas-Peucker algorithm. In some examples, the Linear Simplification strategy (32) uses an internal distance, which is defined as Linear Distance (LD), between the sides of the planar no flight zone polygons (30) and the corresponding sides of the simplified Planar no flight zone polygons (33) to reduce the number of vertices. The example of FIG. 8b shows the resulting simplified polygon no flight zone (71) obtained by applying the example customized Douglas-Peucker algorithm on the same polygon no flight zone (69) of FIG. 8a. A shown in FIG. 8b, the example method selects and keeps the maximum linear distance (LD) distance among the obtained linear distances (72). In some examples, the example Douglas-Peucker algorithm balances between the complexity reduction, computation time and accuracy of the path. In some examples, the linear distance threshold (LDT) is equal to 0 if the Bounding Box simplification strategy (31) is applied.

Figure 5:
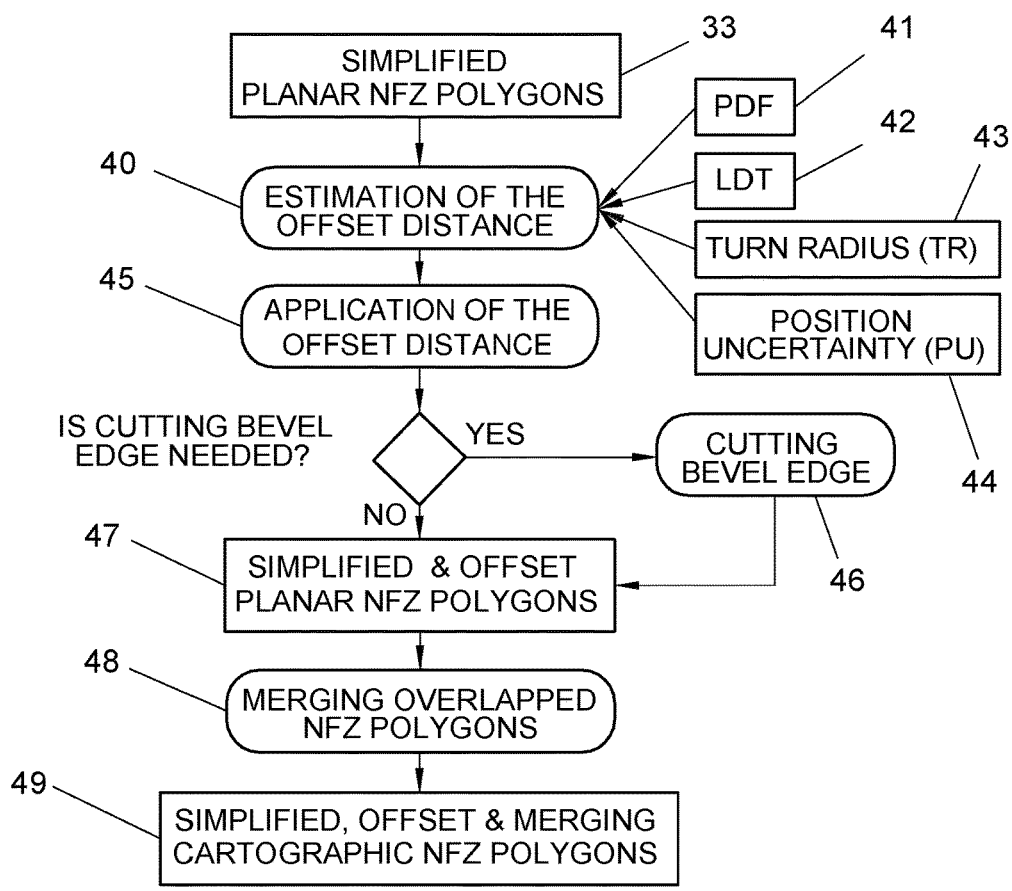
FIG. 5. Shows an example flow diagram of a particular example of the processes that conform the example no-flight zones incursion process of FIG. 1.

In the illustrated example of FIG. 1, the fourth main process is the example no flight zone Incursion Avoidance (5). In some examples, the no flight zone incursion avoidance (5) offsets a safe distance to the Simplified Planar no flight zone Polygons (33) coming from the previous process (e.g., the complexity reduction process (4)). As shown in FIG. 5, the no flight zone incursion avoidance process (5) comprises the following sub-processes:

As illustrated in the example of FIG. 5, the example Estimation of the Offset Distance (40) calculates a safe buffer distance to avoid no flight zone (NFZs) incursions considering all and/or substantially all influence factors that can and/or may contribute to the unmanned aerial system entering the no flight zones (NFZs). In some examples, the safe buffer distance is defined to prioritize no incursions on the no flight zones (NFZs), which implies emphasis of the considered influence factors. Thus, in such examples, the shortest paths may be considered conservative from a safety perspective and hence, will be pseudo-optimal with regard to the real geodetic distance. In some examples, the following factors are considered to influence the offset distance: i) the Projection Distortion Factor (PDF) (41) previously estimated distorts the real geodetic distances; thus, the offset distance measure in the plane are not realistic on the earth surface; ii) the Linear Simplification shifts the boundaries of the no flight zones (NFZs) towards its interior, at most, the linear distance (LD) (42), thus, the Linear Distance (LD) are amended; iii) the worst unmanned aerial system Turn Radius (TR) (43), a less desirable turn radius (43) and/or a turn radius that does not satisfy a threshold is also a factor to consider; iv) the Position Uncertainty (PU) (44) of the unmanned aerial system, which primarily depends on the navigation capabilities of the unmanned aerial system. The following example expression considers these factors to estimate a safe offset distance:

Offset distance(OD)=PDF*(LD+TR+PU)

In some examples, a Constant offset Distance (CD) may be added to ensure and/or enable a minimum distance from the no flight zones (NFZs) to be achieved. In such examples, the final estimation of the offset distance should be:

Offset distance(OD)=PDF*(LD+TR+PU+CD)

Figure 9:
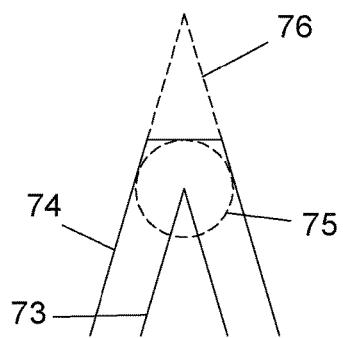
FIG. 9. Shows the application of the example cutting bevel edge strategy to a particular no flight zone.

The Application of the Offset Distance (45) shifts the no flight zone polygons' boundary (73) outwardly by the specific offset distance (OD) (75) calculated in association with the Estimation of the Offset Distance process (40). Based on the process of the application of the offset distance (45), results in a set of offset planar no flight zones (NFZs) (74). In examples in which any of the angles of the offset no flight zone polygons (74) is very acute and/or relatively large, the no flight zone polygons (74) are bevel cut (46) to increase the Configuration Space and avoid and/or deter missing potential lateral paths, as shown in the example of FIG. 9. As illustrated in the example of FIG. 9, the cropped area (76) remains outside the simplified and offset planar no flight zone polygons (47).

Figure 10:
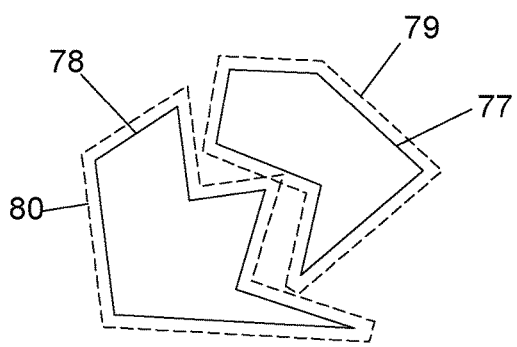
FIG. 10. Shows a particular example in which two no flight zones are overlapped.
Figure 11:
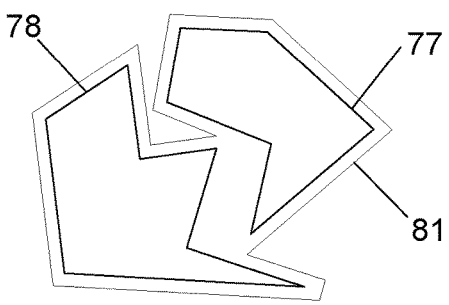
FIG. 11. Shows the example merging strategy applied to the particular example of FIG. 10.

In some examples and as illustrated in the example of FIG. 10, as a result of applying the offset distance, some no flight zone polygons (77,78), with their respective offset areas (79,80) surrounding them, may overlap. In examples in which two no flight zone polygons (77, 78) are identified as intersecting and overlapping, the no flight zone polygons (77, 78) can be merged (48) to create a new simplified no flight zone polygon (49) with a single offset area (81), as is shown in FIG. 11.

Referring back FIG. 1, at the end of the example no flight zone incursion avoidance process (5), a set of Simplified, Offset & Merging Planar no flight zone Polygons (49) are obtained.

Figure 6:
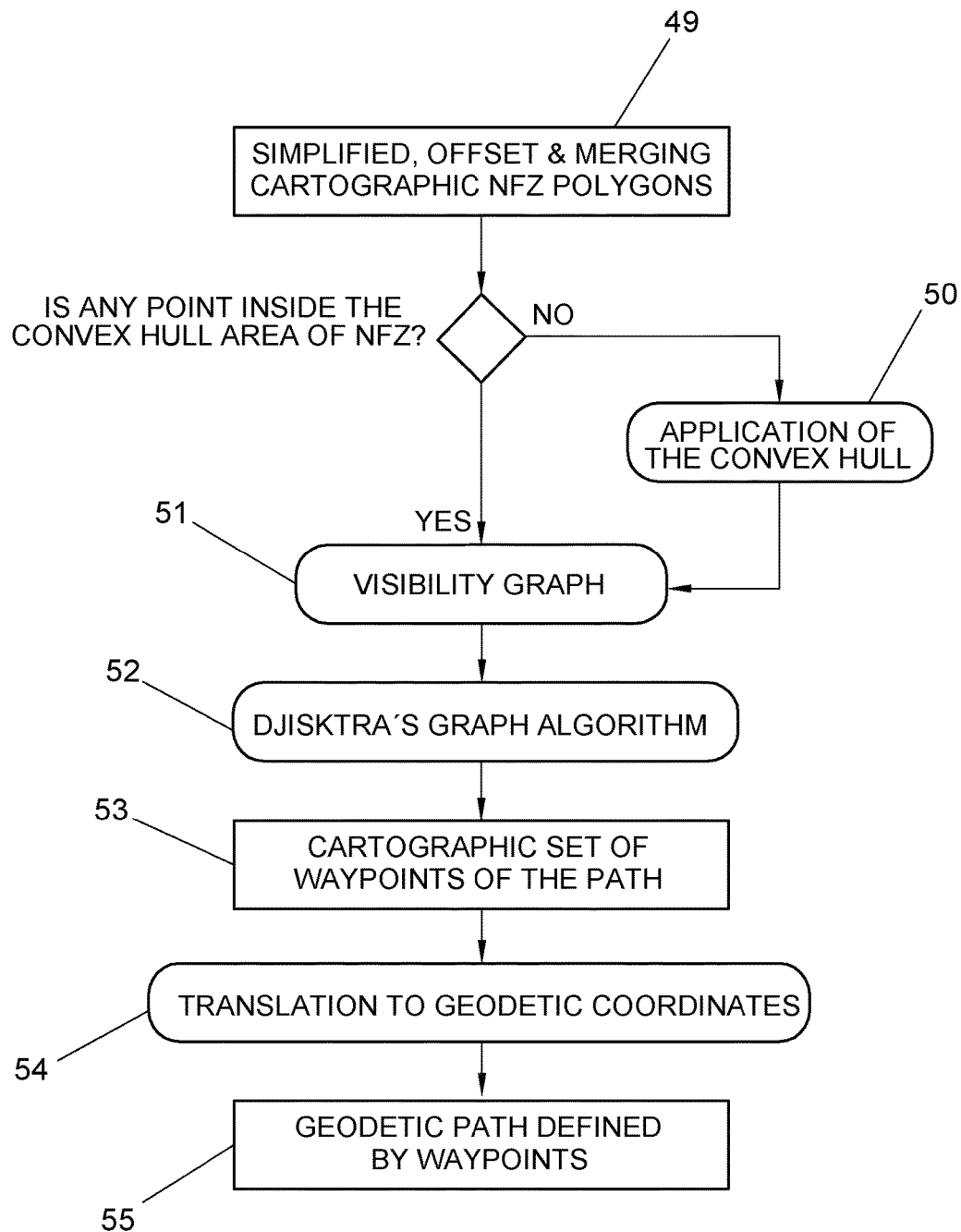
FIG. 6. Shows an example flow diagram of a particular example of the processes that conform the Lateral Path Definition process of FIG. 1.
Figure 12A:
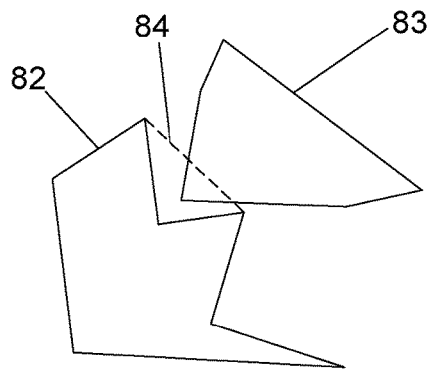
FIG. 12a. Shows particular examples in which the example convex hull algorithm cannot be applied such that a potential path may be discarded.
Figure 12B:
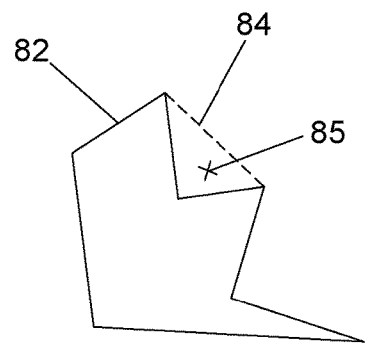
FIG. 12*b* shows an example in which the target point may be discarded.

In the illustrated example of FIG. 1, the fifth main process is the example Lateral Path Identification process (6). In some examples, the lateral path identification process (6) finds the pseudo-optimal shortest path distance between the Source and Target points. As illustrated in the example of FIG. 6, the lateral path definition (6) comprises the following sub-processes:

Referring to FIG. 6, a first sub-process is the application of an example Visibility Graph algorithm (51) to the Shortest Path Configuration Space (SPCS) to find all and/or substantially all the possible lateral paths between the S&T points (e.g., source and target points). In some examples, the visibility graph algorithm finds the shortest path through the convex hull polygons' boundaries. In this example, the input for this sub-process is the example Simplified, Offset & Merging cartographic no flight zone polygons (49) coming from the previous process. Therefore, in some examples, the first internal sub-process is the application of a Convex Hull algorithm (50). In some examples, the convex hull algorithm is not applied in cases in which the source and target points or any other point of a no flight zone is enclosed within the convex hull areas of another no flight zone (NFZ), because in these cases the potential shortest paths may be discarded, for example. The example of FIG. 12a shows a particular case in which the example Convex hull algorithm modifies (see dashed line (84)) the perimeter of a first no flight zone (NFZ1) (82) in such a way that the first no flight zone NFZ1 (82) and a second no flight zone NFZ2 (83) overlap, thereby closing the space between both no flight zones (82,83) and discarding a potential shortest path. In other words, in some examples, when two no flight zones have perimeters that overlap and/or have profiles that interrelate (e.g., a first no flight zone defining a concave perimeter portion into which a convex perimeter portion of a second no flight zone is positioned), the example convex hull algorithm may modify the boundary of the no flight zone by directly intersecting vertices that were previously not directly connected by a single line (84). The example of FIG. 12b shows another particular case in which the target point (85) falls within the convex hull polygons' boundaries. In such an example, if the convex hull algorithm is applied, the method may not find a solution given that the target point (85) is disposed within the no flight zone (82).

Figure 13:
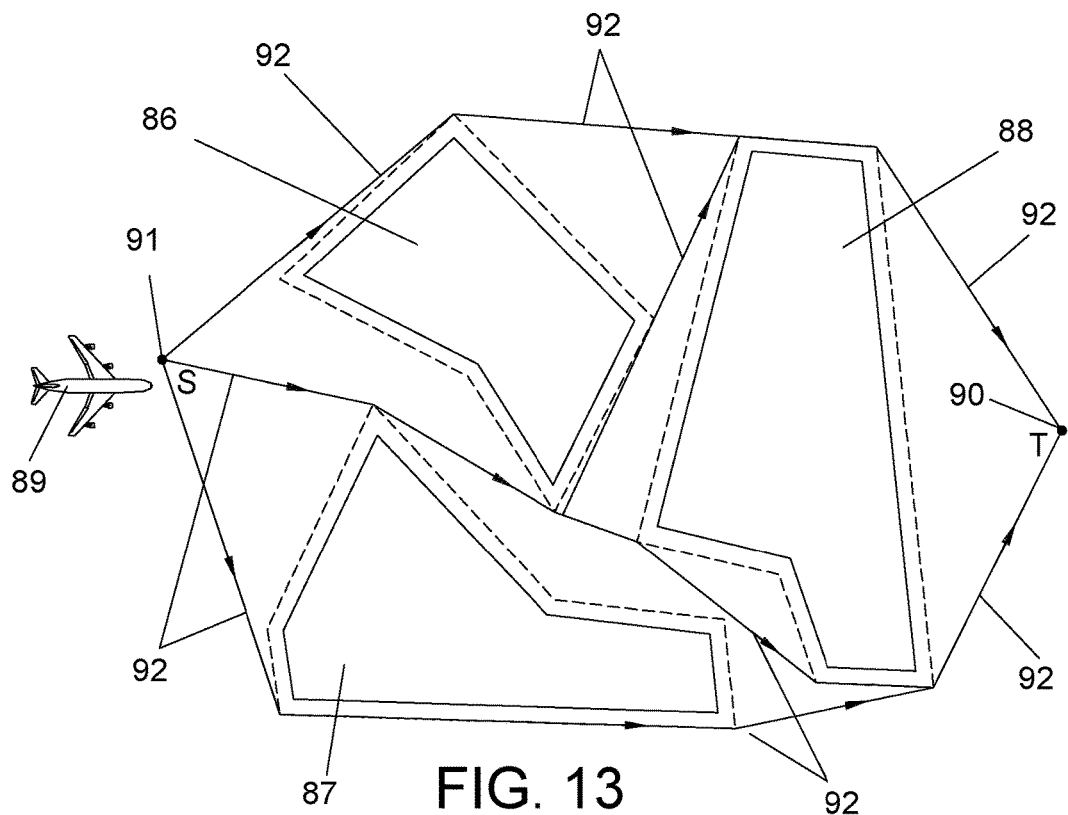
FIG. 13. Shows a particular example in which the example Visibility Graph algorithm is applied to a particular Configuration Space (SPCS) including three no flight zones.

Referring back to FIG. 6, after the application of the example Convex Hull algorithm (50), in the illustrated example, the Visibility Graph algorithm (51) is applied to identify all and/or substantially all likely geometric paths between S&T points (e.g., the source and target points), as shown in FIG. 13. FIG. 13 shows three Simplified, Offset & Merging cartographic no flight zone polygons (86,87,88) where the dashed lines represent the offset areas surrounding the no flight zones (NFZs)) and an unmanned aerial system (89) trying to arrive to a target point (90) from a source point (91). Thus, the examples disclosed herein identify points between the source and target points that do not pass through one of the no flight zones including the safety buffer surrounding and/or adjacent to the respective no flight zone. The example algorithm (51) identifies the visible connections among the overall set of points of the Shortest Path Configuration Space (SPCS). In some examples, if the line segment connecting two points (or locations) does not pass through any obstacle, a new edge between them is created and added to the graph. As shown in the example of FIG. 13, these line segments (92) connect the source and target points with the vertex of the offset areas. These line segments (92) are represented with solid lines in FIG. 13. In addition, in some examples, the length of each edge is calculated (either Euclidean or Geodetic distances) and added as an edge attribute that can be used to identify the shortest path distance.

Referring to the example of FIG. 6, once the visibility graph has been built, the next sub-process is the execution of Dijkstra's algorithm (52) that finds the path with lowest cost (i.e. shortest path distance) between the source and target points.

The example method then selects the cartographic set of waypoints that defines the shortest path (53) and the waypoints are then translated to geodetic coordinates (54) to define a geodetic pseudo-optimal shortest path. Finally, in the illustrated example, the geodetic path defined by waypoints is obtained (55) and the unmanned aerial system will fly the created geodetic shortest lateral path.

In some examples, the obtained shortest lateral path is considered pseudo-optimal for two reasons. For example, the first reason is because working with planar coordinates without distortion can assure that the obtained path is the shortest one and the second reason is that the polygon simplification and offset addition necessarily introduce some distortions that affects the path obtained.

While the examples disclosed above mention no flight zones positioned within the shortest Path configuration space, the method is configured to identify the shortest lateral path even when there is no flight zone inside the Shortest Path Configuration Space (SPCS) since the shortest lateral path will be the straight line.

Figure 14:
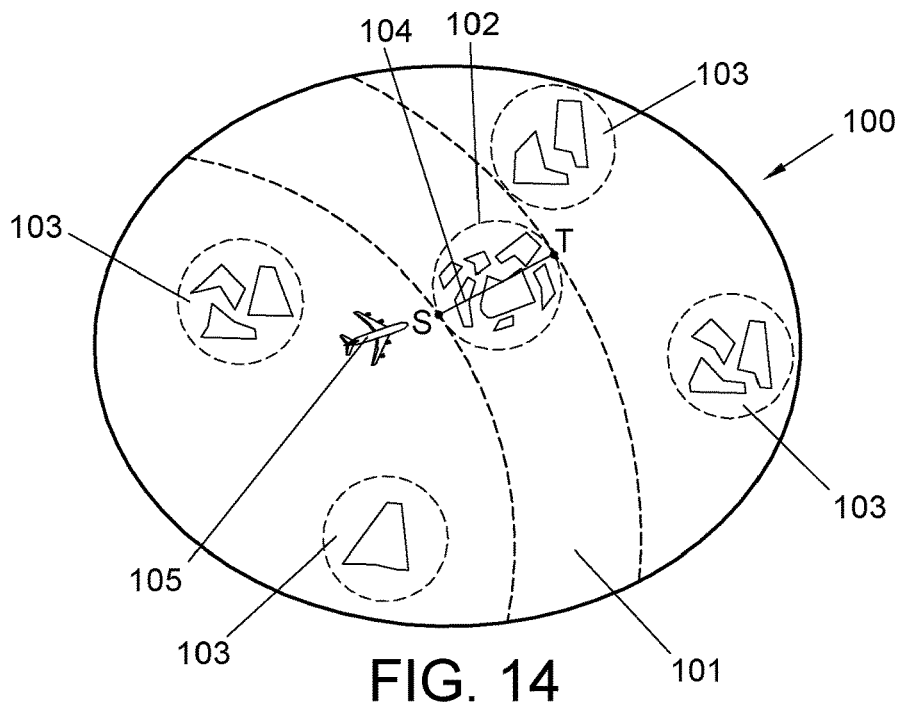
FIGS. 14 to 19. Show a particular example in which the example method of the present disclosure is applied to an example particular geodetic scenario.
Figure 15:
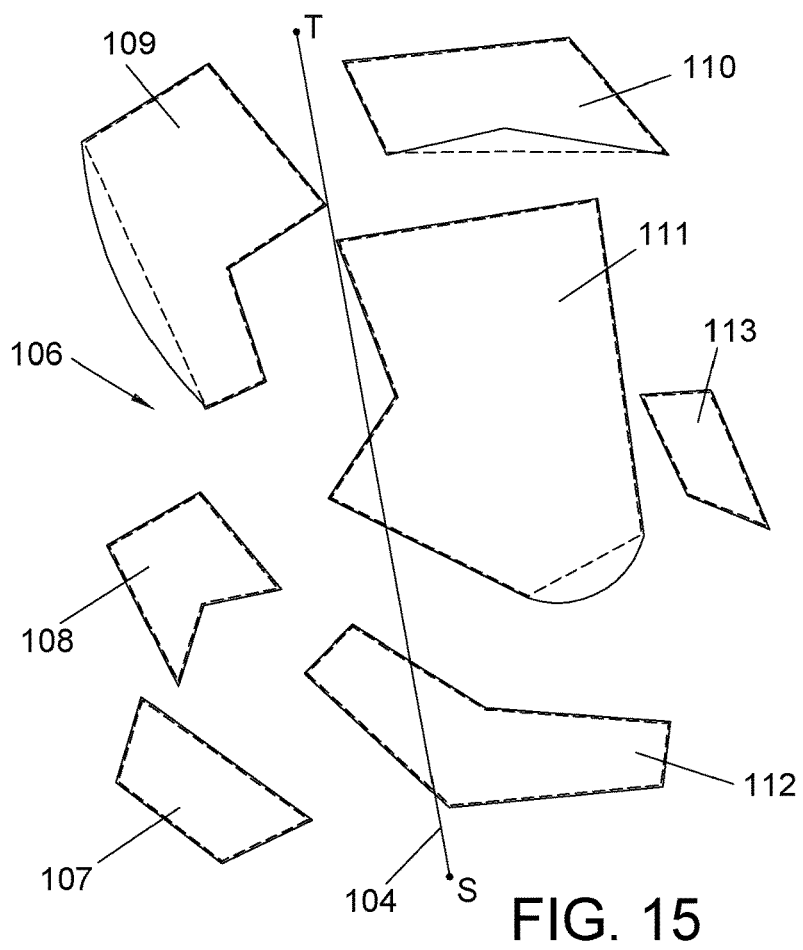

The examples of FIGS. 14 to 19 show a particular example of the method applied to a specific scenario. The example scenario (100) in geodetic coordinates, as shown in FIG. 14, has a Shortest Path Configuration Space (SPCS) (101) delimited between the Source (S) and Target (T) points, the points (T, S) defining the flight intention vector (104) of, for example, a unmanned aerial system platform (105). The example method firstly executes the heuristic process (2) analyzing the initial geodetic scenario (100). As a result of this example heuristic process, the example method obtains a cartographic projection of the initial geodetic scenario (100). In some examples, the Shortest Path Configuration Space (SPCS) (100) comprises a first set of no flight zones (NFZs) (102) potentially involved in the lateral path solution that are considered. As illustrated in FIG. 14, there is a second set of no flight zones (NFZs) (103) located outside of the Shortest Path Configuration Space (SPCS) (101) that will be clipped and/or not considered to reduce the complexity of the initial geodetic scenario. After the application of the geodetic layout transformation (3) to the original geodetic scenario (1), in this example, an original cartographic scenario (106) is obtained, as shown in FIG. 15. The cartographic scenario (106) focuses on the no flight zones (107-113) potentially involved in the lateral path solution. Since the scenario has been clipped to remove the no flight zones (103) that are outside of the shortest Path configuration space (100), the second set of no flight zones (103) has been discarded, in this example, the heuristic process is executed again over the clipped planar scenario (106). The example method estimates a computation time that is used to obtain a lateral path solution and compares the estimated computation time with a reference computation time (e.g., a required computation time that has been previously defined). In this example, a linear simplification strategy is selected to reduce the estimated computation time. Then, the example method calculates the Projection Distortion Factor (PDF) and checks: i) that the Source and Target points are outside of any no flight zone (NFZ); there are no complex polygons; and the Projection Distortion Factor (PDF) obtained satisfies a threshold and/or is under a predefined threshold. The selected linear simplification strategy is applied comprising an example tailored Douglas-Peucker algorithm that simplifies the polygons by reducing the number of vertices of the respective polygons (the resulting no flight zone polygons are marked with dashed lines in FIG. 15). Then, in some examples, the maximum linear distance (LD) is calculated.

Figure 17:
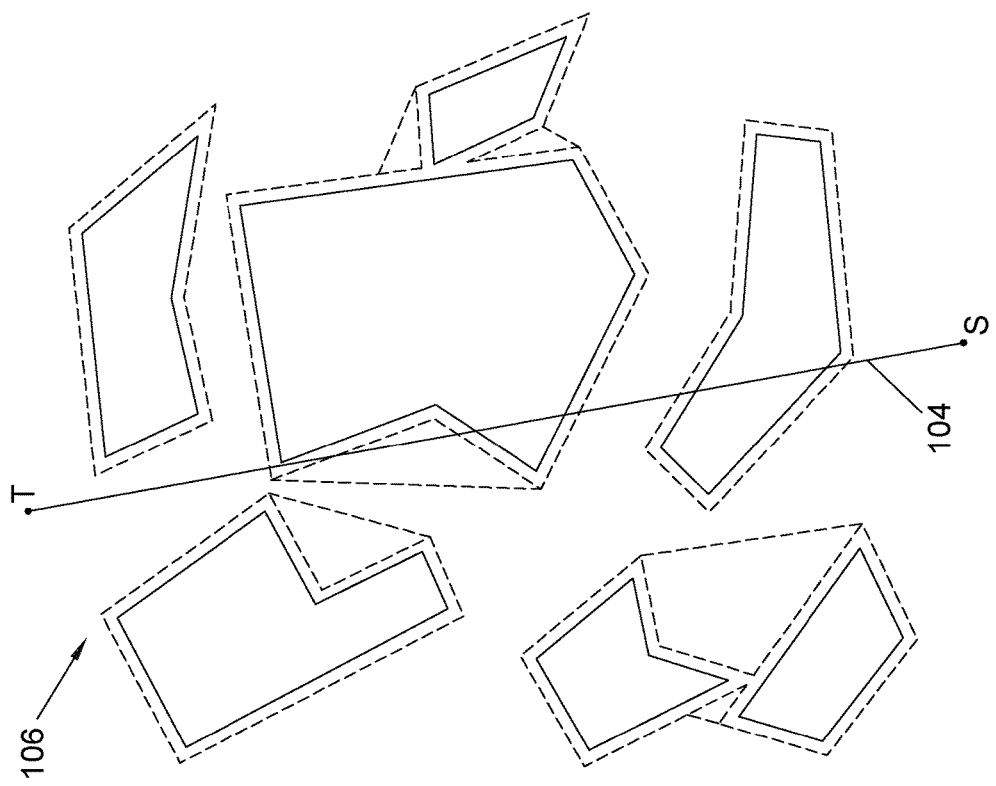
Figure 16:
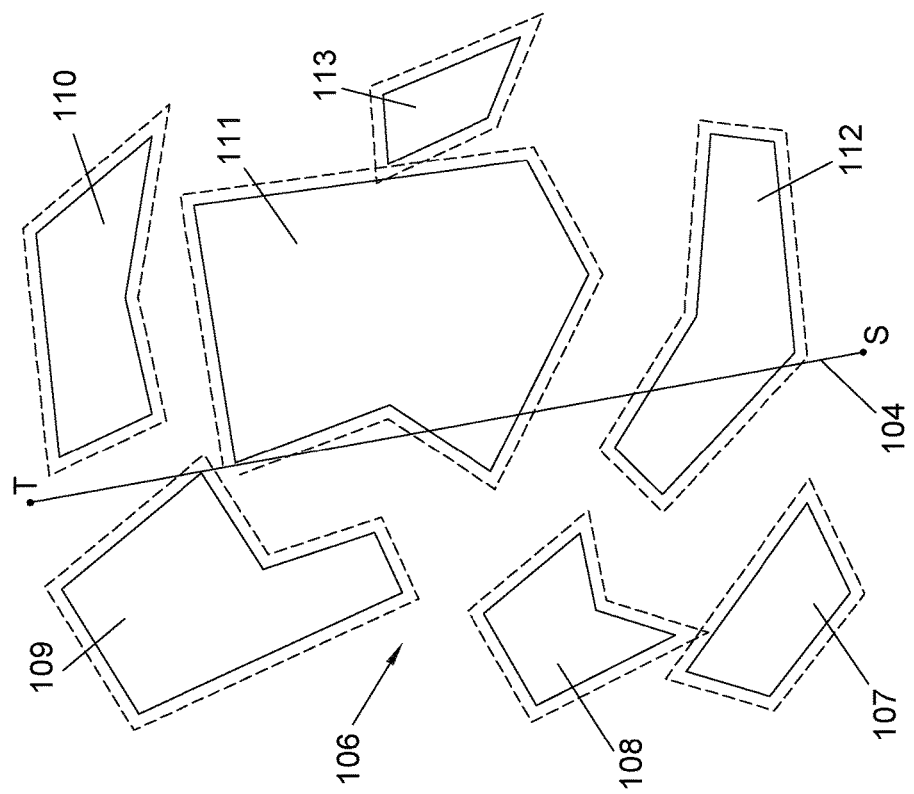

The illustrated example of FIG. 16 shows the simplified no flight zone polygons (107-113) to which the safety area is added. In this example, the dashed line surrounding each no flight zone (107-113) represents the safety area. The safety area is defined by the Projection Distortion Factor (PDF), the Linear Distance and the Turn Radius of the unmanned aircraft (105) and the Position Uncertainty introduced by the onboard navigation system. As shown in the example of FIG. 16, the safety areas of the no flight zones (NFZs) (107,108) and the no flight zones (NFZs) (111,113) overlap, so in accordance with the teachings of this disclosure, the no flight zones (107, 108) are merged as shown in FIG. 17 and the no flight zones (111, 113) are merged as shown is FIG. 17. Optionally, in some examples, the method may cut bevel edges of any of the no flight zones. In this example, the example convex hull algorithm is applied to find, determine and/or identify the shortest path through the example convex hull polygons' boundaries. The illustrated example of FIG. 17 shows the result of the example convex hull algorithm application to the scenario (104) where the safety area of the merged no flight zone (107,108), merged no flight zone (111,113) and the no flight zone (109) is modified, see dashed-dotted line.

Figure 19:
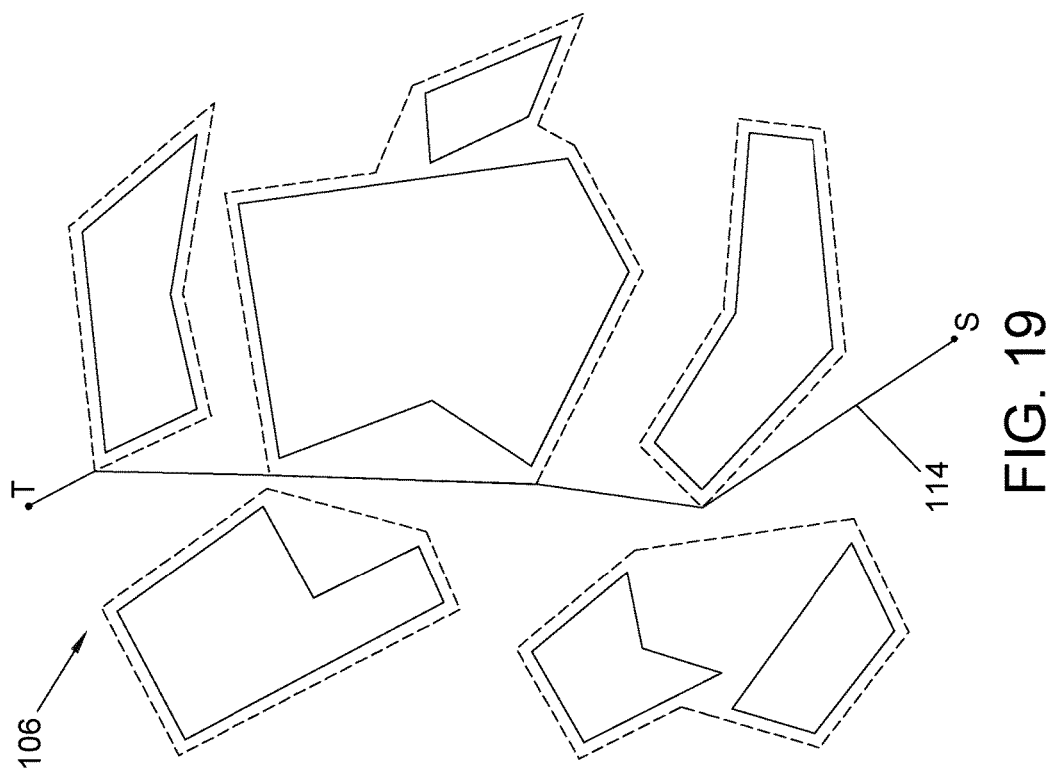
Figure 18:
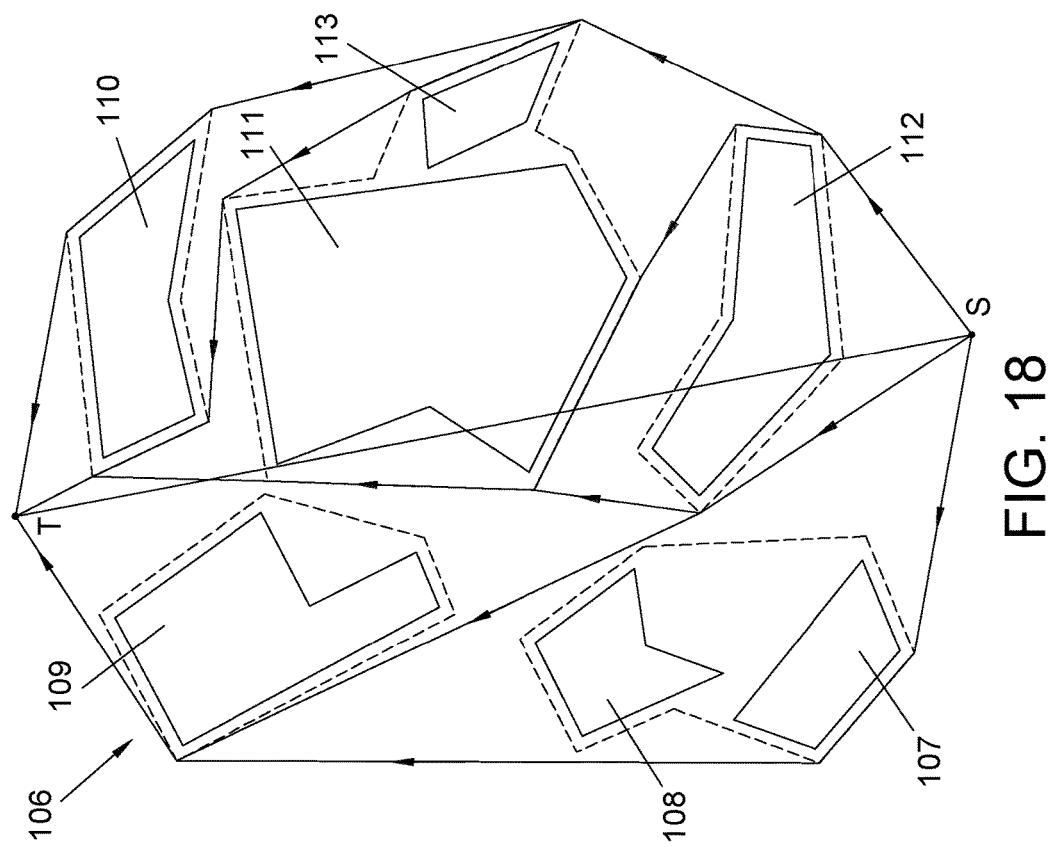

As illustrated in FIG. 17, the no flight zones (NFZs) are shown with the resulting safety areas surrounding them in dotted lines. In some examples, the safety areas defined by the dotted lines surrounding the no flight zones substantially ensure that the unmanned aerial system does not deviate into the respective no flight zones. The example method applies the example Visibility Graph algorithm that identifies all and/or substantially all likely geometric paths between the Source and Target points. As illustrated in FIG. 17, the geometric paths identified connect safety areas' vertices and avoid passing over any of the no flight zones (NFZs). The example method identifies the shortest lateral path (114) by applying the example Dijkstra's algorithm as shown in FIG. 19. The cartographic set of waypoints that defines the shortest path is translated into geodetic coordinates to define a geodetic pseudo-optimal shortest path that is sent to a trajectory generator of the unmanned aircraft. Based on the processes performed in accordance with this disclosure and the path identified that balances computational time while avoiding no flight zones, the unmanned aircraft (105) files the obtained geodetic shortest lateral path (114).

The present disclosure relates to a method and a system for autonomous generation of shortest lateral paths for Unmanned Aerial Systems (UAM) that avoids no-flight zones (NFZs). The disclosure proposes a safe, practical and robust solution for autonomously generating geodetic pseudo-optimal lateral paths for unmanned aerial systems while avoiding no flight zones (NFZs) and taking into account computational time requirements and computational capabilities to obtain the best possible solution that satisfies the time threshold. The method underlies an effective sequence of processes that combine heuristic, geodetic and geometric algorithms to provide an efficient and robust solution for most common unmanned aerial system scenarios.

Autonomous generation of unmanned aerial system flight lateral paths with no intervention from a remote pilot still represents a major challenge in unmanned aerial systems. Limited onboard computational capabilities, high complexity of geodetic scenarios, numerous no flight zones (NFZs) and crowded airspace are some of the issues that still makes this problem difficult. Scenarios in the unmanned aerial system domain are frequently an extensive number of geodetic no flight zone polygons that can be located anywhere in the world, with any extension, with very complex shapes being defined by a large number of vertices. For example, boundaries of the most common geographic features like cities or airports are commonly considered as no flight zones (NFZs). This makes the geodetic identification of the shortest path in extensive areas on the earth's surface, while avoiding no flight zones (NFZs), an issue some examples do not address.

Some of the specific issues associated with the generation of a shortest lateral path for unmanned aerial system are the following:
- each particular unmanned aerial system platform has specific performance characteristics and limitations that are considered to provide safe and flyable trajectories;
- the predictability of vehicle motion and, thus, its position accuracy are subjected to high uncertainties;
- unmanned aerial system scenarios usually comprise a large number of no flight zones (NFZs) with complex geometries that require extensive computational resources and time to be executed, especially under the limited computational resources of the common unmanned aerial system onboard computers. In addition, the operational real-time requirements of the unmanned aerial system missions are also limited; and,
- unmanned aerial system operational scenarios are located anywhere in the world and may have any extension. Defining scenarios on a geodetic datum (e.g. WGS84) increases the complexity of the shortest lateral path solution. Solving the complete geodetic problem in ellipsoidal geometry requires complex geodetic algorithms and extensive computational resources.

The examples described herein consider the cited problems associated with the particularities of the autonomous trajectory definition in unmanned aerial system operational scenarios and provide an autonomous definition of a geodetic pseudo-optimal shortest lateral path for unmanned aerial system avoiding no flight zones (NFZs), that can be defined anywhere in the world and have any geographical extension. Furthermore, the disclosed examples provide improved results within a required time range. The examples grant a safe and robust unmanned aerial system trajectory and provide a balance between computational efficiency and solution accuracy.

An example method of autonomous generation of shortest lateral path for Unmanned Aerial Systems (UAM), wherein a constant Turn Radius (TR) and a constant vertical path of a unmanned aerial system platform is previously defined, comprises receiving an initial scenario defined in cartographic coordinates, the initial scenario comprising a source point and a target point that define a vector representing an initial flight intention of the unmanned aerial system platform and at least one No Flight Zone (NFZ); determining a computation time for obtaining a shortest lateral path that avoids the at least one no flight zone (NFZ), the computation time being proportional to an overall number of vertices of the at least one no flight zones (NFZ), determining whether the determined computation time is less than or equal to a predetermined required computation time; determining a safety area surrounding each individual no flight zone (NFZ), wherein the safety area is defined by an offset distance from the perimeter of the safety area; constructing a visibility graph comprising all the possible lateral paths between the source point and the target point avoiding the no flight zones (NFZs), the possible lateral paths being all possible combinations of vectors connecting the vertices of the safety zones; and determining the shortest lateral path among all the possible lateral paths constructed in the visibility graph.

In some examples, when the initial scenario is defined in geodetic coordinates, the method comprises: defining a cartographic projection of the initial scenario considering a geometric extension and a geographic location of the initial scenario; and translating the initial scenario defined in geodetic coordinates into an equivalent initial scenario defined in cartographic coordinates by applying the defined cartographic projection to the initial scenario defined in geodetic coordinates.

In some examples, the method includes determining a configuration space as an area delimited by two perpendicular lines to the initial flight intention vector, each perpendicular line passing through one of the source and the target points respectively; and, discarding any no flights zone located outside the Configuration Space.

In some examples, when at least one no flight zone has been discarded and at least one of the no flight zones (NFZs) is located inside the Configuration Space, the method further comprising considering only the no flight zones (NFZs) inside the Configuration Space; re-determining a computation time for obtaining a shortest lateral path that avoids the at least one no flight zone (NFZ); re-determining a safety area surrounding each individual no flight zones (NFZ); re-constructing a visibility graph; and re-determining the shortest lateral path among all the possible lateral paths.

In some examples, the method includes determining a scale factor introduced by the translation of the initial scenario defined in geodetic coordinates into the equivalent initial scenario defined in cartographic coordinates. In some examples, when the determined computation time exceeds the required computation time, the method comprising reducing a total number of vertices of the safety areas by applying a vertex reduction algorithm to each safety area. In some examples, the vertex reduction algorithm is performed using at least one of a minimum Bounding Box algorithm or a linear simplification algorithm.

In some examples, determining a safety area surrounding each individual no flight zone further comprises cutting bevel edges of angled portions of the safety areas, where the angled portions have an angle less than a predefined angle threshold. In some examples, determining a safety area surrounding each individual no flight zone further comprises merging overlapped safety areas of contiguous no flight zones (NFZs).

An example system for autonomously generating shortest lateral path for Unmanned Aerial Systems (UAM) comprises: memory storing an autonomous lateral path generator configured to receive an initial scenario in cartographic coordinates, the initial scenario comprises at least one no flight zone and a source and a target point that determine an initial flight intention vector of the unmanned aerial system platform; and a processor configured execute the lateral path generator to: determine a computation time to obtain a shortest lateral path avoiding the no flight zones (NFZs), the computation time being proportional to an overall number of vertices of the no flight zones (NFZs); determine whether the determined computation time is less than or equal to a predetermined required computation time; determine an offset distance, to create a safety area surrounding each no flight zone where the safety area is defined by the safety offset distance and redefining the perimeter of each no flights zone by including such safety area; create a visibility graph with all possible lateral paths between the initial and target points that avoid the redefined no flight zones (NFZs), the possible lateral paths being all possible combinations of vectors connecting the vertices of the safety areas; and determine the shortest lateral path among all generated lateral paths.

In some examples, the lateral path generator is further configured to define a cartographic projection of the initial scenario defined in geodetic coordinates and translating the initial scenario into an initial scenario defined in cartographic coordinates by applying the cartographic projection to the initial scenario. In some examples, the lateral path generator is further configured to determine a Configuration Space as an area delimited by two perpendicular lines to the initial flight intention vector, each perpendicular line passing through the source and target points respectively, and identify and discard any no flight zone located outside the Configuration Space.

In some examples, the lateral path generator is further configured to estimate a scale factor introduced by the translation of the initial scenario defined in geodetic coordinates into the initial scenario defined in cartographic coordinates. In some examples, the lateral path generator is further configured to determine whether the Source and Target points are located outside any safety area and further determine a Projection Distortion Factor as a minimum scale factor that ensures the safety offset distances are always equal or larger than a predetermined minimum safety distance. In some examples, the lateral path generator is further configured to reduce a total number of vertices of the no flight zones (NFZs) by applying a vertex reduction algorithm to each no flight zone (NFZ).

An example computer program product for autonomously generating a shortest lateral path, the computer program product comprises: a computer-readable storage medium having computer-readable program code embodied therewith, the computer-readable program code executable by one or more computer processors to: determine a computation time to obtain a shortest lateral path avoiding the no flight zones (NFZs), the computation time being proportional to an overall number of vertices of the no flight zones (NFZs); determine whether the determined computation time is less than or equal to a predetermined required computation time; determine an offset distance, to create a safety area surrounding each no flight zone where the safety area is defined by the safety offset distance and redefining the perimeter of each no flight zone by including such safety area; create a visibility graph with all possible lateral paths between the initial and target points that avoid the redefined no flight zones (NFZs), the possible lateral paths being all possible combinations of vectors connecting the vertices of the safety areas; and determine the shortest lateral path among all generated lateral paths.

The example methods and systems disclosed herein relate to autonomously generating shortest lateral paths for Unmanned Aerial Systems (UAS) that avoids no-flight Zones (e.g., NFZs, no-fly zones) while taking into account computational time requirements and computational capabilities to satisfy a threshold, obtain optimal and/or beneficial real time solutions. As defined herein, the no flight zones and/or no-fly zones are territories or areas over which aircraft are not permitted to fly. The examples disclosed herein include an example method of autonomous generation of a shortest and/or lesser lateral path for Unmanned Aerial Systems (UAS) where a constant Turn Radius (TR) and a constant vertical path of an unmanned aerial system platform is previously defined and/or known. The example method includes the processes of receiving example initial and/or a first scenario defined in cartographic coordinates where the first scenario includes a first Source point and a first Target point that define a first vector representing an example initial and/or first flight intention of the unmanned aerial platform and at least one no flight zone (NFZ). In some examples, the example method includes estimating a first computation time for obtaining the shortest and/or a lesser lateral path that avoids the no flight zone(s) where the first computation time (e.g., the required computation time) is directly proportional to an overall number of vertex of the no flight zone(s). In some examples, the method includes comparing the estimated first computation time to a reference computation time (e.g., a computation time previously provided) to determine that the estimated first computation time is less than or equal to the reference computation time.

In some examples, the method also includes determining a safety area surrounding each no flight zone where the safety area is defined by an offset distance; and constructing a visibility graph and/or an example graph that includes all and/or substantially all possible lateral paths between the first Source point and the first Target point that avoid and/or substantially avoid the no flight zone(s). In some examples, the possible lateral paths include all and/or substantially all possible combinations of vectors connecting the vertices of the safety zones. In some examples, the method includes determining the shortest lateral path among all the possible lateral paths generated in the visibility graph.

In some examples, when the first scenario is defined in geodetic coordinates instead of cartographic coordinates, the example method defines a first cartographic projection of the first scenario considering a first geometric extension and a first geographic location of the first scenario; and translates the first scenario defined in geodetic coordinates into an equivalent initial and/or second scenario defined in cartographic coordinates by applying the defined cartographic projection to the first scenario defined in geodetic coordinates.

Advantageously, in some examples, to reduce the complexity of the lateral path calculation, the example method determines a configuration space as an area delimited by and/or bounded by two perpendicular and/or substantially perpendicular lines. As used herein, substantially perpendicular means within about fifteen degrees of perpendicular. In some examples, each perpendicular and/or substantially perpendicular line passes through the first Source point and first Target point respectively, to the initial and/or first flight intention vector; and, discards and/or does not consider any no flight zones located outside the configuration space.

In some examples, when at least one no flight zone has been discarded and at least one of the no flight zones is located inside the configuration space, the method further includes determining the shortest lateral path considering only the no flight zones inside the configuration space. In other words, the example method may not consider no flight zones outside of the configuration space The example method estimates a first scale factor for each point of the second scenario that is introduced by the translation of the first scenario defined in first geodetic coordinates into the second scenario defined in cartographic coordinates. In some examples, the first scale factor is a variable parameter that depends on the longitude and latitude values of the different points of the geodetic scenario and represents a measure of the distortion introduced by the cartographic projection.

In some examples, the method checks that the first Source and first Target points are located outside any surrounding safety areas of the no flight zones and estimates a first Projection Distortion Factor (PDF) as the minimum scale factor that ensures and/or substantially ensures that the safety offset distance is always equal or larger than a minimum safety distance. This projection distortion factor will be the scale factor that assures that none of the safety offset distances in the defined cartographic plane will be lesser than a minimum safety distance established in the geodetic ellipsoid. In other words, the examples disclosed herein ensure and/or substantially ensure that unmanned aerial vehicles maintain a distance from no flight zones and/or maintain a minimum distance from a safety offset of the respective no flight zones.

In some examples, when the estimated computation time exceeds the required computation time, the method reduces the total number of vertices of the safety areas by applying an example vertex reduction algorithm to each safety area. In some examples, this example vertex reduction algorithm is selected between an example minimum Bounding Box algorithm and an example linear simplification algorithm. When the example linear simplification algorithm is selected, in some examples, the method applies an example tailored Douglas-Peucker algorithm to each no flight zone determining a maximum Linear Distance (LD) that corresponds to a largest simplification distance between each original no flight zone or the corresponding simplified no flight zone.

In some examples, the Offset Distance employed in determining the safety area is calculated by the following expression:

Offset distance=PDF×(TR+PU)

where PDF is the Projection Distortion Factor, TR is the Turn Radius of the unmanned vehicle system platform and PU is a Position Uncertainty value of the unmanned vehicle system platform. In examples in which the linear simplification algorithm is applied to the safety areas, the Offset Distance is calculated by the following expression Offset distance=PDF×(TR+PU+LD)

where LD is the maximum Linear Distance.

In some examples, a constant safety area may be introduced to increase the security distance between the unmanned aerial system and the no-fly zones, so the offset distance can be calculated by the following expression:

Offset distance=PDF×(TR+PU+LD+CD)

where CD is the Constant Safety Distance added to the Offset Distance.

In some examples if the first scenario is directly provided in cartographic coordinates, so there is no need of a cartographic projection, the offset distance will be calculated as the sum of the Turn Radius plus the Position Uncertainty value and eventually plus the Constant Safety Distance and/or the Linear Distance.

In some examples, determining a safety area surrounding each individual no flight zone includes cutting bevel edges of angled portions of the safety areas, where the angled portions have an angle less than a predefined angle threshold. Preferably, in some examples, the angle threshold might be any possible angle between 0 and 90 degrees.

In some examples, determining a safety area surrounding each individual no flight zones further includes merging overlapped safety areas of contiguous no flight zones. In other words, a safety area may include two or more no flight zones that are near and/or immediately adjacent one another and/or the safety area may encompass multiple no flight zones.

In some examples, determining a safety area surrounding each individual no flight zone and/or surrounding multiple no flight zones includes applying an example convex hull algorithm to the safety areas for simplifying the resulting no flight zone polygons.

In some examples, the present disclosure provides an example system for autonomously generating shortest lateral path for unmanned aerial systems that avoids no flight zones. The system includes an example autonomous lateral path generator configured to receive an initial and/or first scenario in cartographic coordinates, the first scenario includes at least one no flight zone and a first source and a first target point that determine and/or define an initial and/or first flight intention vector of the unmanned aerial system platform; means for determining a first estimated computation time for obtaining the shortest lateral path between the first source point and the first target point that avoids the no flight zones, the first estimated computation time being directly proportional to an overall number of vertex of the no flight zones, and checking that the estimated computation time is less than or equal to a reference computation time and/or required computation time previously provided; means for determining an offset distance, creating a safety area surrounding each no flight zone where the safety area is defined by the safety offset distance and redefining the perimeter of each no flight zone by including such safety area and/or changing a first perimeter of a first no flight zone to be a second perimeter greater than the first perimeter where the second perimeter includes the safety area. In some examples, the example system includes means for creating a visibility graph with all possible lateral paths between the initial, source and/or target points that avoid the redefined no flight zones, the possible lateral paths being all possible combinations of vectors connecting the vertices of the safety areas; and the example lateral path generator being further configured to determine the shortest lateral path among all generated lateral paths. In other words, the examples disclosed herein determine a short and/or shortest path of a mission by identifying a first no flight zone and including a safety buffer about the first flight zone such that the first no flight zone is a second no flight zone that is larger than the first no flight zone where the second no flight zone includes the safety buffer.

Advantageously, in some examples, the example system includes means for defining a cartographic projection of the initial scenario defined in geodetic coordinates and translating the initial scenario into an equivalent initial scenario defined in cartographic coordinates by applying the cartographic projection to the initial scenario.

In some examples the example system further comprises means for determining a configuration space as an area delimited by two perpendicular and/or substantially perpendicular lines, where each perpendicular line passing through the first Source point and first Target point respectively, to the initial flight intention vector; and means for identifying and discarding any no flight zone located outside the Configuration Space.

The example system includes means for estimating a scale factor introduced by the translation of the first scenario defined in geodetic coordinates into the second scenario defined in cartographic coordinates. In some examples, the first scenario defined by the geodetic coordinates is substantially similar to the second scenario defined in cartographic coordinates.

In some examples, the example system includes means for checking that the first Source point and first Target point are located outside any safety area and means for estimating a Projection Distortion Factor as the minimum scale factor that ensures that the safety offset distances are always equal or larger than a minimum safety distance.

In some examples, the example system reduces a total number of vertices of the no flight zones by applying an example vertex reduction algorithm to each no flight zone. In some examples, the vertex reduction algorithm is preferably selected between a Bounding Box algorithm and a linear simplification algorithm.

Some of the advantages of the present disclosure include the ability to consider geodetic issues related to distortions as well as scenarios in planar coordinates. Thus, in some examples, a simplification of the technical problem is herein described. The examples disclosed herein work with geodetic scenarios and consider issues related to distortions to provide a more accurate solution. To do that, in some examples, the cartographic projection is autonomously selected to better reduce the distortion factors which is a technical difference with some examples.

The example systems and methods enable the handling of any type of geometric scenarios with no limitation regarding their extension, number of no flight zone polygons, shape or location of both the no flight zones and the first Source and first Target points.

The example method also includes an example clipping task to select the no flight zones directly related to the shortest path problem. Such an approach enables the reduction of the complexity of the scenarios.

The example systems and methods consider as input a computational time requirement in which a possible resulting path is to be found. Then, in some examples, the systems and methods estimate the expected computation time for the input scenario and decides, identifies and/or determines an example simplification strategy to meet such time requirement. As a consequence, in some examples, a pseudo-optimal shortest path is obtained. Some examples solutions do not consider a computational time requirement, which is an important drawback that could put at risk the unmanned aerial systems mission.

Using the examples disclosed herein, assumptions about the scenario have been reduced as much as possible to provide a robust solution for any scenario. In contrast, some examples assume different simplifications: i) they consider input scenarios as local planar scenarios to remove the complexity because of geodetics and cartography; ii) the configuration space is usually well identified from scratch; iii) they assume polygons directly related to the shortest path problem are clustered in limited areas; iv) they assume small number of simple polygons (defined by a few vertices).

Some examples do not provide a robust autonomous solution for any geographic scenario. The examples disclosed herein enable increased flexibility by providing a robust autonomous solution that addresses different operational scenarios. Some examples include some human tasks to conveniently prepare each operational scenario according to the mission requirements. However, the examples disclosed herein include consciously preparing the scenarios related to a mission.

The example autonomous definition of the safety offset distance considers the most relevant uncertainty factors. In some examples, the offset distance is calculated by the sum of two components, a constant component and/or value provided by the user and a second component and/or value internally calculated by the method. This way, the example method ensures no invasion of the no flight zones and fits better the configuration space, making the method more efficient, robust and safe. In contrast, some examples typically work with a constant offset value that is initially estimated by users.

The examples disclosed herein increase the automation, efficiency and safety of unmanned aerial system operations in cases where lateral path definition is used and/or required. In some examples, minimum human intervention or even no intervention is needed to define pseudo-optimal shortest paths, which is significantly relevant in some situations (e.g. a failure onboard, a critical failure onboard).

The examples disclosed herein reduce the impact on the environment by determining and/or selecting the shortest flight path. In some examples, the shortest path is generally associated to the most efficient path in terms of fuel consumption. Furthermore, potential risk of incursion in natural protected areas can be reduced if they are included as no flight zones.

To address the issue of the existence of specific performances and limitations in the unmanned aerial system, in some examples, the example method assumes: i) the turn radius of the unmanned aerial system will be initially defined and will be constant during the execution of the shortest path (e.g. the worst case turn radius of the unmanned aerial system platform may be considered) and; ii) the vertical path of the unmanned aerial system will be constrained to safe and constant altitudes.

In some examples, safety margins are added to avoid no flight zones incursions to reduce the high uncertainties associated with the motion predictability and position accuracy of the unmanned aerial systems.

The examples disclosed herein also reduce the complexity of the scenario (e.g., the initial scenario) by avoiding computation time limitations, to provide the best possible solution into the required time range.

The examples disclosed herein translate the geodetic scenario (e.g., the first scenario) into a planar one reducing the complexity of the unmanned aerial system operational scenarios. In some examples, such translations i) distorts planar no flight zones and; ii) increases the uncertainty of the geodetic location of the unmanned aerial system. To address such issues, the examples disclosed herein reduce the distortion into reasonable values and take them into account in the overall solution.

Some of the applications or uses of the proposed example methods and systems may be: advanced unmanned aerial system autonomous contingency management functions such as Return-Home, Lost-Link, Engine-Out and Sense & Act capable of avoiding no flight zones in an efficient and robust way and Ground Control Stations (GCS) to support the remote pilot in the modeling of lateral flight paths for unmanned aerial system operations. Besides unmanned aerial system applications, the example method may be also valuable in the ATM domain, for trajectory planning and procedure design purposes as well as a baseline algorithm for dynamic trajectory management automation tools such as conflict resolution.

The invention claimed is:

1. A system, comprising:
memory storing computer readable code; and
at least one processor to execute the computer readable code to cause the at least one processor to:
access an initial scenario including a source point, a target point, and a no flight zone;
determine a computation time for identifying a lateral path for an aircraft to traverse that avoids the no flight zone, the computation time being associated with a first number of vertices of the no flight zone;
determine whether the determined computation time satisfies a threshold of a reference computation time;
when the computation time does not satisfy the threshold of the reference computation time, change the first number of vertices of the no flight zone to a second number of vertices of the no flight zone to enable a subsequently determined computation time to satisfy the threshold;
determine a buffer area surrounding the no flight zone, wherein the buffer area is defined by an offset distance from a perimeter of the no flight zone;
construct a visibility graph including lateral paths between the source point and the target point, the lateral paths not passing through the no flight zone, the lateral paths connecting the first number of vertices or the second number of vertices of the no flight zone, the first number of vertices or the second number of vertices taking into account the buffer area; and
identify a first lateral path of the lateral paths, the first lateral path being shorter than others of the lateral paths.

2. The system of claim 1, wherein when the initial scenario is defined in geodetic coordinates, and the computer readable code, when executed, causes the at least one processor to convert the geodetic coordinates to cartographic coordinates.

3. The system of claim 2, wherein the computer readable code, when executed, causes the at least one processor to convert the geodetic coordinates to cartographic coordinates by using a scale factor.

4. The system of claim 1, wherein the no flight zone includes a first no flight zone, further including a second no flight zone, and the computer readable code, when executed, causes the at least one processor to:
define a configuration space between the source point and the target point, the configuration space bounded by a first line intersecting the source point and a second line intersecting the source point; and
identify the second no flight zone as being outside of the configuration space.

5. The system of claim 4, wherein the computation time is a first computation time, and the computer readable code, when executed, causes the at least one processor to, in response to identifying the second no flight zone as being outside of the configuration space, determine a second computation time for obtaining a second lateral path that avoids the first no flight zone, the determining not considering the second no flight zone.

6. The system of claim 5, wherein the buffer area is a first buffer area, the visibility graph is a first visibility graph, and the lateral paths are first lateral paths, and the computer readable code, when executed, causes the at least one processor to, in response to the second computation time satisfying the threshold of the reference computation time:
determine a second buffer area surrounding the first no flight zone;
construct a second visibility graph including second lateral paths between the source point and the target point, the second lateral paths avoiding the first no flight zone; and
identify a third lateral path of the second lateral paths, the third lateral path being shorter than others of the second lateral paths.

7. The system of claim 6, wherein the first lateral path is different from the third lateral path.

8. The system of claim 1, wherein the computer readable code, when executed, causes the at least one processor to change the first number of vertices of the no flight zone by applying a vertex reduction algorithm to the no flight zone.

9. The system of claim 8, wherein the computer readable code, when executed, causes the at least one processor to apply the vertex reduction algorithm by applying at least one of a minimum Bounding Box algorithm or a linear simplification algorithm.

10. The system of claim 1, wherein the buffer area includes a first buffer area, and the computer readable code, when executed, causes the at least one processor to modify the first buffer area to reduce a size of the first buffer area to a second buffer area after identifying an angled portion of the first buffer area satisfying a threshold.

11. The system of claim 1, wherein the no flight zone includes a first no flight zone and a second no flight zone, the first no flight zone overlapping the second no flight zone.

12. The system of claim 11, wherein the computer readable code, when executed, causes the at least one processor to merge the first and second no flight zones when the first no flight zone overlaps the second no flight zone.

13. A system, comprising:
memory storing computer readable code; and
at least one processor to execute the computer readable code to cause the at least one processor to:
define an area between a source point and a target point;
identify a first no flight zone within the area;
identify a second no flight zone outside of the area;
estimate a first computation time to determine a first lateral path for an aircraft to traverse between the source point and the target point, the estimating to consider the first no flight zone, the estimating not to consider the second no flight zone;
compare the first computation time to a reference computation time;
modify the first no flight zone to be a third no flight zone when the first computation time does not satisfy a threshold of the reference computation time; and estimate a second computation time to determine a second lateral path for the aircraft to traverse between the source point and the target point, the estimating to consider the third no flight zone.

14. The system of claim 13, wherein the computer readable code, when executed, causes the at least one processor to define a buffer area around the third no flight zone, the estimating to consider the third no flight zone.

15. The system of claim 14, wherein the computer readable code, when executed, causes the at least one processor to identify lateral paths between the source point and the target point when the second computation time satisfies the threshold of the reference computation time, the lateral paths not passing through the third no flight zone, the lateral paths connecting vertices of the third no flight zone.

16. The system of claim 15, wherein the computer readable code, when executed, causes the at least one processor to process the lateral paths to identify a third lateral path, the third lateral path being shorter than others of the lateral paths.

17. The system of claim 13, wherein the third no flight zone includes a fourth no flight zone and a fifth no flight zone, the fourth no flight zone overlapping the fifth no flight zone.

18. The system of claim 17, wherein the computer readable code, when executed, causes the at least one processor to merge the fourth and fifth no flight zones to form the third no flight zone when the fourth no flight zone overlaps the fifth no flight zone.

19. The system of claim 13, wherein the computer readable code, when executed, modifies the first no flight zone to be the third no flight zone by applying a vertex reduction algorithm to the first no flight zone.

20. A system, comprising:
memory storing computer readable code; and
at least one processor to execute the computer readable code to cause the at least one processor to:
determine an initial path estimate between a source point and a target point associated with a flight of an aircraft;
identify a first no flight zone and a second no flight zone;
determine a first buffer area surrounding the first no flight zone and a second buffer area surrounding the second no flight zone, wherein the first buffer area is defined by an offset distance from a perimeter of the first no flight zone and the second buffer area is defined by an offset distance from a perimeter of the second no flight zone;
identify an overlap between the first no flight zone including the first buffer area and the second no flight zone including the second buffer area;
merge the first no flight zone including the first buffer area and the second no flight zone including the second buffer area into a third no flight zone including a third buffer area when the overlap is identified;
construct a visibility graph including lateral paths between the source point and the target point, the lateral paths not passing through the third no flight zone including the third buffer area, the lateral paths connecting vertices of the third no flight zone; and
identify a first lateral path of the lateral paths, the first lateral path being shorter than others of the lateral paths.

21. The system of claim 20, wherein the computer readable code, when executed, causes the at least one processor to translate the first lateral path to a geodetic pseudo-optimal lateral path for use by the aircraft.

22. The system of claim 20, wherein the computer readable code, when executed, causes the at least one processor to cause the aircraft to follow the first lateral path.

23. The system of claim 20, wherein the aircraft is an unmanned aerial vehicle, and the computer readable code, when executed, causes the at least one processor to determine the initial path estimate between the source point and the target point associated with the unmanned aerial vehicle.

* * * * *